United States Patent [19]

Baker

[11] Patent Number: 5,642,209

[45] Date of Patent: Jun. 24, 1997

[54] DIRECTIONAL LIGHT FILTER AND HOLOGRAPHIC PROJECTOR SYSTEM FOR ITS PRODUCTION

[76] Inventor: Kenneth M. Baker, 13659 Victory Blvd., Van Nuys, Calif. 91401

[21] Appl. No.: 381,204

[22] Filed: Jan. 31, 1995

Related U.S. Application Data

[63] Continuation-in-part of Ser. No. 20,668, Feb. 22, 1993, abandoned.

[51] Int. Cl.$^6$ ..................................................... G03H 1/10
[52] U.S. Cl. .................. 359/10; 359/15; 359/28; 359/35; 359/577; 430/5
[58] Field of Search .................. 359/577, 10, 15, 359/20, 28, 35, 569, 599, 1; 430/5

[56] References Cited

U.S. PATENT DOCUMENTS

| | | | |
|---|---|---|---|
| 3,120,437 | 2/1964 | Lindquist | 430/152 |
| 3,203,803 | 8/1965 | Habib et al. | 430/186 |
| 3,635,545 | 1/1972 | VanKerkhove et al. | 359/577 |
| 3,883,232 | 5/1975 | Tsunoda | 359/577 |
| 4,095,875 | 6/1978 | Lee et al. | 359/515 |
| 4,265,534 | 5/1981 | Remijan | 359/577 |
| 4,403,028 | 9/1983 | Mustacchi et al. | 430/178 |
| 4,421,398 | 12/1983 | Suzuki et al. | 354/200 |
| 4,496,216 | 1/1985 | Cowan | 359/566 |
| 4,633,093 | 12/1986 | Hahn | 250/492.2 |
| 4,802,719 | 2/1989 | Magariños et al. | 359/15 |
| 4,880,667 | 11/1989 | Welch | 427/160 |
| 4,998,787 | 3/1991 | Caputi et al. | 359/22 |
| 5,245,466 | 9/1993 | Burns et al. | 372/27 |

FOREIGN PATENT DOCUMENTS

| | | | |
|---|---|---|---|
| 2952607 | 7/1980 | Germany | 359/577 |

OTHER PUBLICATIONS

SMI Form 1021, Aug. 1, 1985 –Technical Report MMT A3 1134 Pawlewicz et al.

James J. Cowan, "The Holographic Honeycomb Microlens", SPIE vol. 523, Applications of Holography, (1985).

J. Cowan, "The Recording and Large Scale Replication of Crossed Holographic Grating Arrays Using Multiple Beam Interferometry" SPIE vol. 503, Application, Theory, and Fabrication of Periodic Structures, (1984).

H. Dammann et al "High–Efficiency In–Line Multiple Imaging by Means of Multiple Phase Holograms", *Optics Comm.*, vol. 3, No. 5, pp. 312–315, Jul. 1971.

D. Burkhard et al. "Simplified Formula for the Illuminance in an Optical System", *Appl. Optics*, vol. 20, No. 5, pp. 897–909, Mar. 1981.

M. Burns et al., "Optical Matter: Crystallization and Binding in Intense Optical Fields", *Science*, vol. 249, Aug. 1990, pp. 749–759.

P. Rhodes et al., "Refractive Optical Systems for Irradiance Redistribution of Collimated Radiation: Their Design and Analysis", *Applied Optics* vol. 19, No. 20, pp. 3545–3553, Oct. 1980.

*Primary Examiner*—Paul M. Dzierzynski
*Assistant Examiner*—John Juba, Jr.
*Attorney, Agent, or Firm*—Kelly Bauersfeld Lowry & Kelley, LLP

[57] ABSTRACT

A photosensitive optical body is exposed by a diverging three-dimensional standing wave interference pattern generated by a holographic projector system. The projector system, using binary optics, creates a diverging lattice of hexagonal or square rod-like intensity maxima extending through the optical body. After the standing wave image is recorded and fixed, the optical body will contain a honeycomb-like grid or pattern that will cause either an absorption or a refractive index modulation effect on light that differs in incidence to the direction of normal propagation through the created channels to a focus or convergence point. This produces either a volume-absorption hologram or a volume-phase hologram (transmittance function modulated by the permittivity [index of refraction]) with such properties as depth of focus, high resolution, and a one-way (directional perspective) and anti-glare effect with reduced diffraction. Unique photosensitive aromatic diazo compounds which possess high thermal stability and soluble in non-polar solvents are provided. In the volume-absorption hologram, the compounds react with couplers within the optical body during development to form azo dye in the areas corresponding to destructive interference during exposure. While chiefly intended for use in eyeglass lenses, the optical body may also find use in telescopes, detectors, film and video cameras, and various other optical devices. The holographic projector system also affords a production method of writing highly-corrected peripheral as well as center-field mesh patterns on planar or non-planar surfaces.

32 Claims, 10 Drawing Sheets

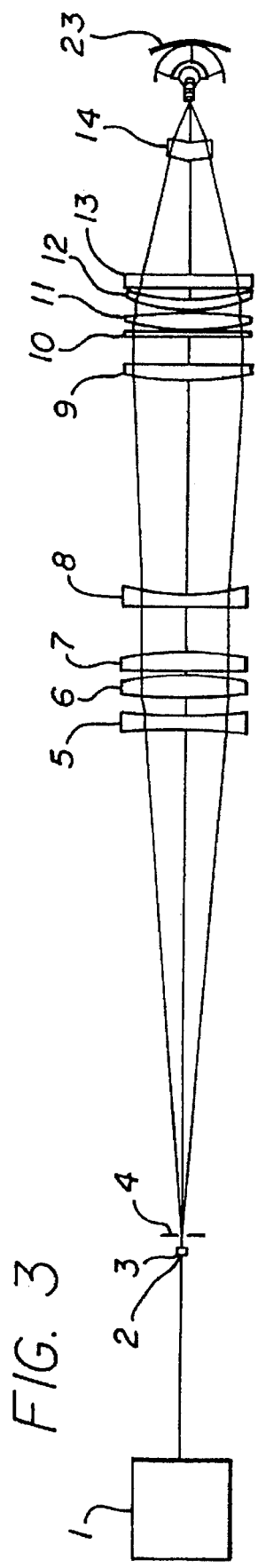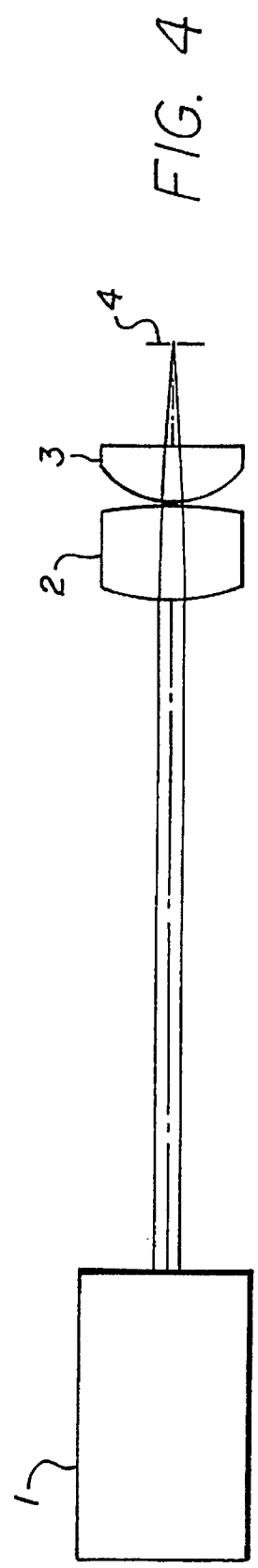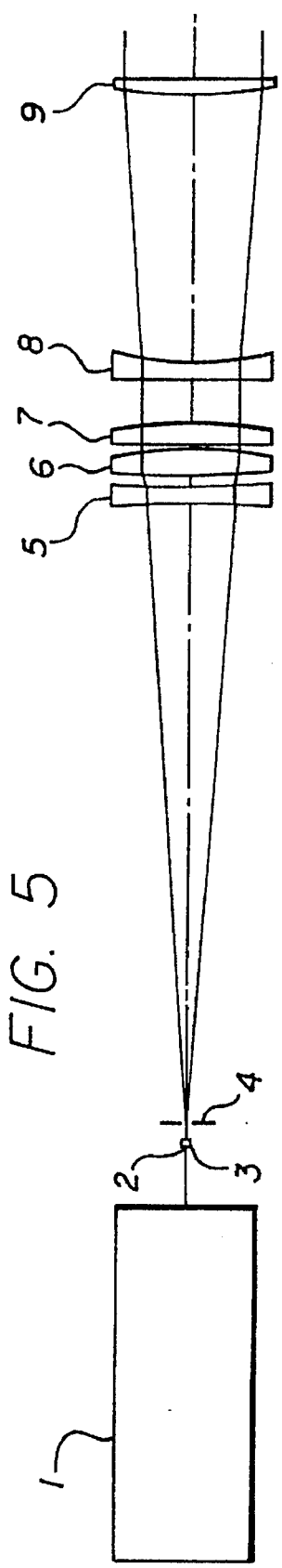

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |

| 1 | 2 | 1 | 2 | 1 | 2 | 1 | 2 |
|---|---|---|---|---|---|---|---|
| 0 | 3 | 0 | 3 | 0 | 3 | 0 | 3 |
| 1 | 2 | 1 | 2 | 1 | 2 | 1 | 2 |
| 0 | 3 | 0 | 3 | 0 | 3 | 0 | 3 |
| 1 | 2 | 1 | 2 | 1 | 2 | 1 | 2 |
| 0 | 3 | 0 | 3 | 0 | 3 | 0 | 3 |
| 1 | 2 | 1 | 2 | 1 | 2 | 1 | 2 |
| 0 | 3 | 0 | 3 | 0 | 3 | 0 | 3 |

DIRECTIONAL LIGHT FILTER AND HOLOGRAPHIC PROJECTOR SYSTEM FOR ITS PRODUCTION

This is a continuation-in-part of U.S. patent application Ser. No. 08/020,668, filed Feb. 22, 1993, now abandoned.

BACKGROUND OF THE INVENTION

This invention relates generally to an improved optical lens or the like, and its related method of production and system components used in connection therewith, to provide improved depth of field, high resolution, and a one-way (directional perspective) and anti-glare effect with reduced diffraction.

In the prior art, anti-glare eyeglasses are well known and have been the subject of many patents. Generally, they have consisted of polarizing and/or occluding elements in or on the lenses such as gratings, louvers, or painted strips. Some of the latter have even had movable parts, but all of these occluding elements tended to obstruct vision. Polarized eyeglass lenses are generally only effective in reducing or eliminating glare from a certain range of angles, while allowing glare from a complementary range of angles to propagate through the lenses.

Pinhole eyeglasses, containing an array of pinholes in each lens in an opaque material, are known to achieve a remarkable focusing effect on both near and far images, with a keen resolution. However, this depth of field effect is adversely fragmented across the image panorama due to an uneven blending of the images from each pinhole. This problem is not present in smaller, closer-packed meshes such as nylon mesh stocking material, but here there is a diffusion effect. The holes in the mesh material do not possess a deep enough aspect ratio (depth divided by diameter) and the material does not possess the proper absorbent quality nor the same refractive index as the holes to eliminate the edge diffractions which cause the diffusion effect.

There is a special problem in creating a three-dimensional grid pattern of a relatively large depth and of a size that is small enough to be unnoticeable. Unless exotic methods are used, neither etching nor photographic techniques can achieve the necessary aspect ratio. The general rule in microlithography is that the depth of the detail cannot be held much past its width. Thus, for example, if the walls of the grid are 2 microns wide, and a mask containing this detail is contact printed onto a photosensitive substrate with collimated light, the detail will hold in the photosensitive substrate to a depth of about 2 microns before light diffusion destroys the detail. Holographic methods, in which the image is essentially "in focus" at any depth have been a way around this problem.

In accordance with prior holographic techniques, a laser beam has been divided into three or four parts and then recombined to achieve a grid pattern of interferometric fringes. See U.S. Pat. No. 4,496,216 (1985). The patterns were recorded on photographic film or plates or in a photoresist coating on a substrate. This provided the most practical means for writing a micron-sized mesh on a non-planar substrate such as a dome. This has been used for creating patterned induced transmission filters (ITFs) for missile nose cones. However, in these endeavors, the beams were usually projected from perhaps a meter away onto a dome-shaped substrate no larger than about 75 mm in diameter. No attempt was made to optically correct the distortion (stretching) effect of the intensity pattern where the incoming beams impinge at an oblique angle near the edges of the dome. Here the pattern will be skewed (elongated) in the direction of curvature.

SUMMARY OF THE INVENTION

The present invention establishes a new technique and provides related system components for exposing a photosensitive optical body with a diverging three-dimensional standing wave interference pattern generated by a holographic projector system. The projector system, using binary optics, creates a diverging lattice of hexagonal or square rod-like intensity maxima extending through the optical body. In a preferred embodiment, after the standing wave image is recorded and fixed, the optical body will contain a honeycomb-like grid or pattern that will cause either an absorption or a refractive index modulation effect on light that differs in incidence to the direction of normal propagation through the created channels to a focus or convergence point. This produces either a volume-absorption hologram or a volume-phase hologram (transmittance function modulated by the permittivity [index of refraction]) with such properties as depth of field, high resolution, and a one-way (directional perspective) and anti-glare effect with reduced diffraction.

The present invention also includes unique photosensitive aromatic diazo compounds which possess high thermal stability and are soluble in non-polar solvents. In the volume-absorption hologram these compounds react with couplers within the optical body during development to form azo dye standing wave images in the areas corresponding to destructive interference during exposure.

While the invention is chiefly intended for use in producing eyeglass lenses, the resultant optical body may also find use in telescopes, detectors, film and video cameras, and various other optical devices. Also in the present invention, the holographic projector system affords a production method of writing highly-corrected peripheral as well as center-field mesh patterns on planar or non-planar surfaces.

These and other advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a schematic representation of one preferred embodiment of the holographic projector system of the present invention;

FIG. 4 is an enlarged schematic representation of the front end of an illuminator section of the holographic projector system of FIG. 3;

FIG. 5 is an enlarged schematic representation of an expander-collimator section of the holographic projector system;

DETAILED DESCRIPTION OF THE INVENTION

Figure 1:
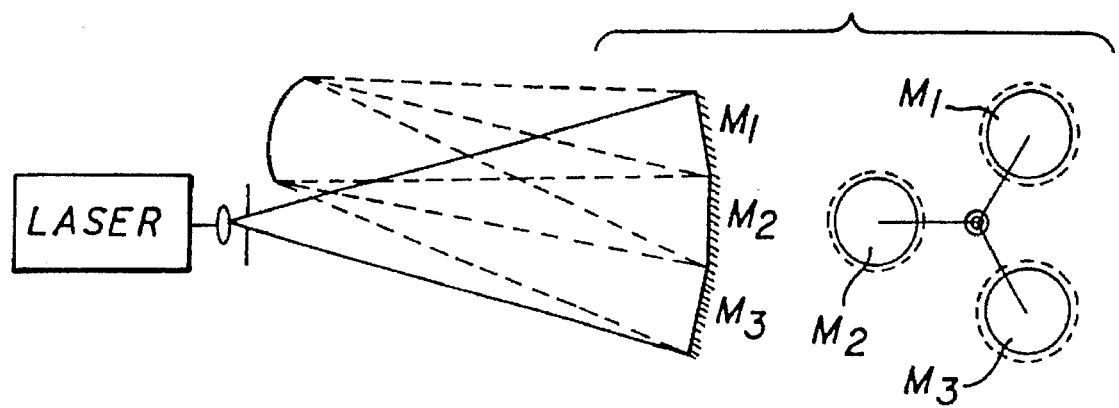
FIG. 1 is a schematic representation of a three beam exposure technique, demonstrating the division-of-wavefront (DOW) method.
Figure 2:
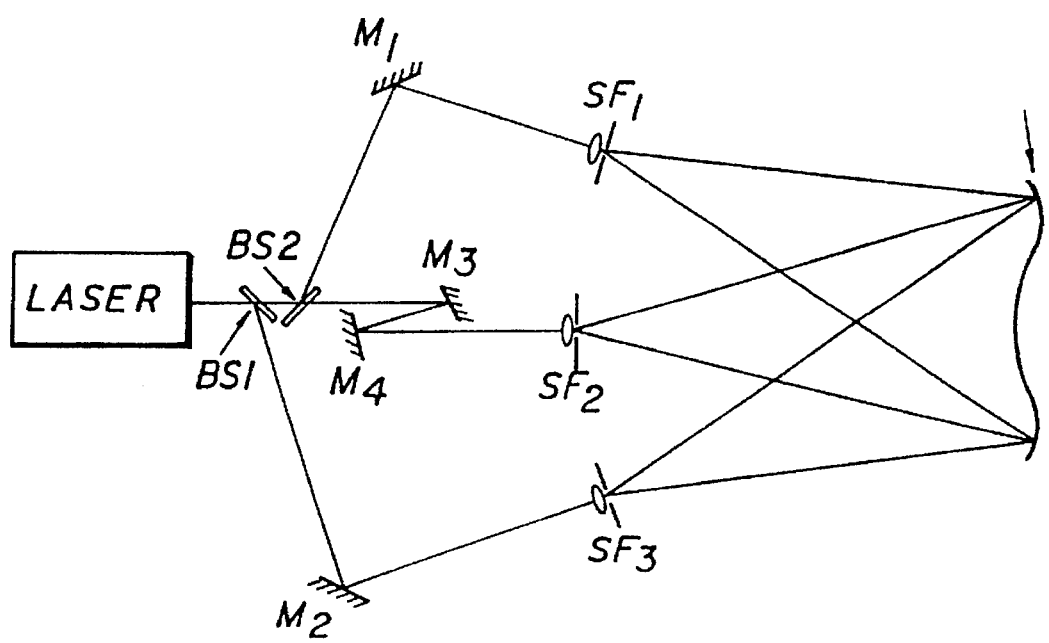
FIG. 2 is a schematic representation of a three beam exposure technique, demonstrating the division-of-amplitude (DOA) method.

Two types of optical setups have been used in the past to perform the three or four beam exposures of a photosensitive optical body with a standing wave interference pattern. As one example, the so-called division-of-wavefront (DOW) technique is shown in FIG. 1 with three writing beams, whereas the division-of-amplitude (DOA) is shown in FIG. 2, also with three writing beams. (Four beams may be used in either case, with the four beams arranged in a circle around a central axis.) Each system has its own advantages and disadvantages.

The three beam DOW setup uses three mirrors $M_1$, $M_2$, and $M_3$ arranged equilaterally to intercept an expanded laser beam. The mirrors reflect back three beams which are recombined at a point off-axis to the incoming beam. The DOW setup is simple and requires few optical components. Also, the angles between the beams may be quickly changed to make a different mesh pitch, which is very useful for research and development purposes.

One disadvantage of the DOW is that over half the light from the laser is lost, since the mirrors intercept only a portion of this light and the spatial filter (pinhole-objective) which is used to remove "noise" from the laser is positioned before the mirrors, which are the final elements and may have dust or defects which could cause imperfections in the mesh pattern. Ideally, the spatial filter would be the last element, and dust or slight defects in the prior optical components would not matter.

Unless special optics are used to change the transverse intensity profile of a laser beam to a so-called flat-top configuration with substantially uniform intensity across the beam cross section and considering the profile normally to be Gaussian ($TEM_{00}$), the mirrors, which each intercept a different portion of the expanded Gaussian beam, will reflect back non-identical intensity portions of the beam. This results in the interfering rays having unequal intensities, causing differences in the amplitude of the intensity pattern contours which ultimately will effect contrast. However, if special optics such as an apodizing filter or other lenses are used to create a beam with a transverse flat-top profile, it or they should be positioned after the spatial filter. Otherwise, depending on the size of the pinhole of the spatial filter and thus the amount of clipping of the beam, the spatial filter will have a tendency to change the profile away from flat-top due to the folding into the beam of the pinhole edge diffraction light.

An alternative to the DOW setup is the division-of-amplitude (DOA) method as is shown in FIG. 2. Here, three beams of equal intensity are obtained by the use of beam splitters. After re-directing with mirrors $M_1-M_4$, the three beams are then individually spatially filtered by spatial filters $SP_1-SP_3$, and expanded before being recombined. This system is more complicated and much more difficult to align. Depending on the coherent length of the laser used, the three beam pathways must be kept close to equidistant. Generally, it is recommended that the pathways be kept within 1 cm of each other for lasers such as argon ion (Ar) or helium-cadmium (He-Cd). The coherent length for Ar lasers is 2–4 cm; for He-Cd lasers it is 8–10 cm. An etalon may be used instead of adjusting beam length, but at the expense of about half the beam power. If the path lengths are too nonuniform and thus the phasing is out of syncronicity, it will affect the contrast of the intensity patterns formed. In the four beam system, moiré patterns may form if the beams are not closely equal in length. However, in the three beam system, the interference configuration keeps moiré patterns from forming.

The DOA setup has certain advantages over the DOW setup such as shorter production exposure times due to more efficient use of the laser output, fewer imperfections in the mesh pattern due to the spatial filters being the last system elements before the target, and the option of a larger mesh writing area when using similar beam expansion ratios as in the DOW setup.

For mesh pattern writing in photoresist, there are three practical choices in a laser wavelength; an argon ion (Ar) laser at 363.789 nanometers (nm), an argon ion (Ar) laser at 457.935 nm, and a helium-cadmium (He-Cd) laser at 441.567 nm. The UV line, 363.789 nm, has been preferred over the others because of slightly better resist images. Exposure times have ranged from 60 seconds with an Ar laser with a 100 mW output at 363.789 nm, 90 seconds with an Ar laser with a 1.5 W output at 457.935 nm, to 20 minutes with a He-Cd laser with a 50 mW output at 441.567 nm. The bulk of the present photoresist world market is made up of diazonaphthoquinone/novolak (DNQ/N) resist systems which have a relatively broad spectral response permitting the use of the 457.935 nm Ar laser line. Most other commercial aromatic diazo compounds such as those used for azo dye imaging have little or no sensitivity at this wavelength.

In the present invention, by comparison with the above-discussed prior art techniques, the system is far more integrated. Since the depth of the holographic standing wave pattern is a prime consideration, special attention has been paid to creating a design that does not introduce subtle distortions in the diverging honeycomb-like patterns. No mirrors have been used, thus minimizing polarization effects. Binary optics have been utilized for both compactness and minimization of phase-induced distortions because they emit beam arrays with an inherent symmetry for any one part of each beam in relation to the central axis of the optical system and/or to the corresponding part of another beam. Multiple correcting lens elements have been added at the tail-end of the system to correct for the foreshortening of the interferometric angles at off-axis points toward the edges of the spherical field. This foreshortening of the angles otherwise causes a stretching effect known as "pincushion distortion" in the grid pattern towards the edges of the field. This distortion is not readily noticeable in projection systems as in FIGS. 1 and 2 if the target is a meter away and has a maximum size of about 75 mm. However, in a wide angle system where either the target is large or extremely close this type of distortion can be quite severe.

The holographic projector system of the present invention utilizes an optics system such as that embodied in FIG. 3. FIG. 4 is a close-up of the front-end or light source illuminator part of the optical system. The laser at 1 is directed into a beam expander-collimator shown with lens elements 2 and 3 which focus the beam onto a pinhole spatial filter at 4. The expanded beam then passes through lens elements 5, 6, and 7 for recollimation (FIG. 3). Beam expander-collimators of this general type are available, for example, from the Newport/Klinger Corporation of Irvine, Calif.

From the expander-collimator, the broad collimated beam is passed through a pair of lenses 8 and 9 for transversely redistributing the beam intensity profile to a substantially uniform flat-top or other specially designed intensity profile. The lenses 8 and 9 are plano-aspheric calcium fluoride ($CaF_2$) lens elements made by diamond turning and are used to reshape the nonuniform Gaussian ($TEM_{00}$) profile of the beam to achieve substantially even illumination at the ultimate exposure surface of the photosensitive substrate or target at 23 which is located at the rear-end of the main optical system depicted in FIG. 3 with a close-up illustration in FIG. 6.

The aspheric lens elements 8 and 9 used in the preferred embodiment were designed by first performing an energy density ray trace on the whole system according to the method of *Rhodes and Shealy* and also *Burkhard and Shealy* (See Appl. Opt. 19, pp. 3545–3553 (1980) and 20, pp. 897–909 (1981) which are incorporated by reference herein) in which a conventional ray trace (which only calculates the directional cosines normal to the wavefront) is performed along with a calculation of the irradiance or amplitude of the ray on each surface from a flux-flow equation. Improvements were made in the calculations by factoring the fourth order equation in the first paper to a quadratic resulting in less numerical analysis in solving the differential equation and thus less error. Also better algorithms have become available in the last ten years. Instead of evaluating the polynomial on a Scientific Subroutine Package (SSP-IBM, 1970), which is based on Newton-Raphson's technique, followed by the use of a Runge-Kutta method, the polynomial was solved by a subroutine DXZPLRC of "Fortran Subroutines for Mathematical Applications" (IMSL Inc., Version 2.0, September 1991) which evaluates the zeroes of the polynomial with real coefficients using Laguerre's method. This was followed by the use of another subroutine DQDAG of IMSL for the integration step using a globally adaptive scheme based on Gauss-Kronrod rules. Thus instead of using cubic spline polynomials for each segment of the aspheric surface, a conic plus aspheric term is used, so that one function describes the whole surface, which also corresponds to the type of function used for diamond turning systems. The reduction of numerical errors in the calculation of the beam reshaping surfaces has resulted in a major improvement in that the maximum overall difference in light redistribution from the ideal in the outgoing beam is less than 0.03%.

The diameter of a Gaussian mode ($TEM_{00}$) laser beam is generally defined as the width between the $1/e^2$ points which is where the beam intensity has fallen to $1/e^2$ of its peak or axial value. This includes about 86.5% of the total energy of the Gaussian beam. Using the above beam reshaping technique it has been possible to reshape the beam to points beyond the $1/e^2$ points, making it an especially efficient beam reshaping system.

Consideration has been given for achieving even more efficiency by using the higher order Hermite Gaussian modes. In the laser industry they are called multimode or higher order mode. However, the higher order Hermite Gaussian modes are not rotationally symmetrical because of amplitude peaks that project out as "bumps" on the intensity profile. Multimode lasers actually have a mixture of high, medium, and lower Hermite Gaussian modes that are superimposed onto each other so that much of the areas between the amplitude peaks are filled in. A "megamode" laser has extremely high order modes that are filled in enough so that they form almost a flat-top profile. It is estimated that the "bumps" on the intensity profile do not vary the intensity by much more than about 3%. Still, this would represent a sizeable error factor when attempting to fit a function to the intensity profile for purposes of fabricating aspheric lenses for beam profile reshaping, especially when variations caused by instabilities among the modes are considered.

The output of the illuminator section, which has a substantial cross-sectional diameter, on the order of an 80 mm collimated light beam coming out of the second beam reshaping element at 9 in FIG. 5, is then put directly into a holographic diffraction grating at 10 which is at the front-end of the main optical system of the embodiment of the complete holographic projector system of the present invention, shown in FIG. 3. The holographic diffraction grating 10, which may also be called a Fourier phase-array generator, divides up the wavefront which then reconstitutes itself into either three or four sets of spectral orders, depending on the design of the grating. Most of the energy is contained in the first spectral orders and each of the either three or four first orders have essentially the same intensity. In this type of holographic diffraction grating, each order has the same diameter or shape as the input beam. Since the pupil plane was designed to be very close to the surface of lens elements 11 (in this embodiment, 0.635 mm), the etched side of the holographic diffraction grating 10 is placed facing lens element 11. The spectral order-beams diverge from each other as they are collectively contracted through the objective lens elements 11, 12, 13 and 14 (which are sized so as not to clip the beams) until they finally separate and come to individual focal points on the focal plane at 15. Pinholes at 15 shown in FIG. 6 will normally be attached to individual adjustable positioners (not shown) set at each beam focal point. The positioners have x, y, and z three-dimensional translation and optionally may have rotational ($\theta_1$ and $\theta_2$) movements which control both yaw and pitch.

The pinholes 15 act perhaps more as field stops than as spatial filters in that they are large enough so as not to clip the beams enough to introduce substantial fold-in diffraction rays. The pinholes are important here to act as field stops for all orders of diffraction but the first orders from the holographic diffraction grating. Thus they remove zeroth, second, and higher orders of diffraction plus aberrational and scattered light. Fiber optic positioners with x, y, z, and $\theta_1$, and $\theta_2$ movements are useful as compact translation stages for the pinholes. The positioners are mounted peripherally around the lens system with the pinholes attached to extension arms. An extra positioner with an extended piece of opaque pinhole-type substrate may be included to stop out the central axis or zeroth order light.

Figure 6:
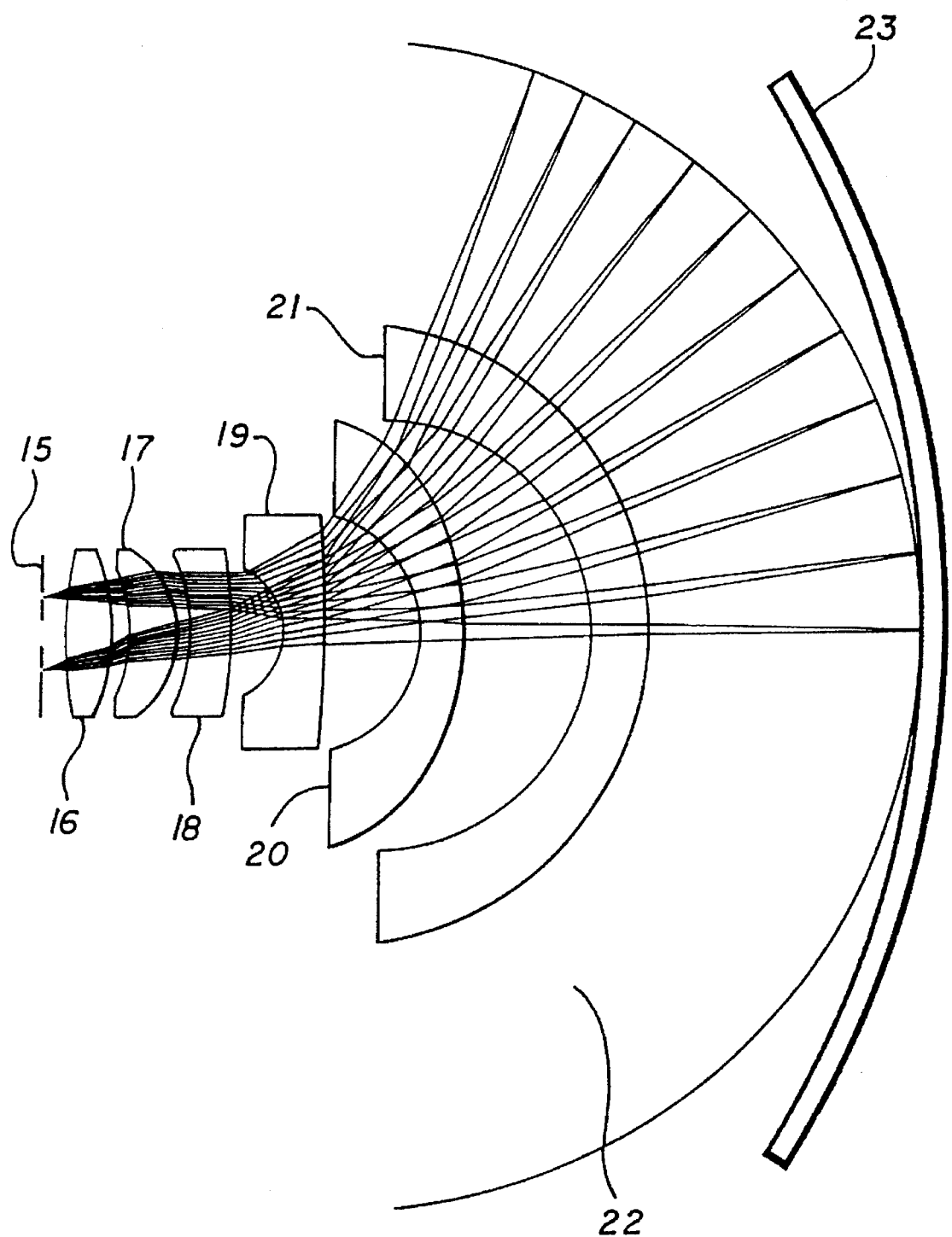
FIG. 6 is a further enlarged schematic representation showing the distortion correcting lens section in conjunction with a photosensitive optical body.

In FIG. 6, the lens elements 16, 17, 18, 19, 20 and 21 comprise a correctional lens system for the off-axis stretching distortion of the standing wave grid pattern, and this correctional system is optimized for a spherical field. These tail-end optics create virtual focal points on a virtual focal plane. As the interferometric light ray angles from the real focal points would normally decrease more and more the further off-axis they are, the virtual focal points spread further and further to correct toward keeping the interferometric angles the same. Otherwise, the smaller the interferometric angles, the bigger the fringe pattern would become, hence the stretching effect towards the edges of the field.

Even though the fan-array of interferometric angles shown in FIG. 6 resembles focal points, they are not focal points in the conventional sense. They are merely angles selected at the surface of a spherical field which has a radius of 27 mm and a center at the center point of the virtual focal plane. The angles demonstrate the optimization for equal angles along the illustrative spherical field. In this system, interferometric angles at the surface of the target or photosensitive optical body 23 will not all be equal, since the peripheral angles will be smaller because that part of the surface is further away. This will result in the grid pattern increasing in size towards the periphery. However, from the perspective of the center point of the virtual focal plane, the grid pattern and hence the three-dimensional honeycomb-like resulting pattern when recorded within the optical body will perspectively be equally sized. The interferometric angles may, of course, be optimized for fields other than concave spherical, or optimization may be done for concave spherical fields whose center of curvature is not at the center point of the virtual focal plane.

One feature of this particular tail-end correctional lens system design is that not only are all of the off-axis interferometric angles corrected, but that all normals to the three or four light ray interfering bundles intersect the center point of the virtual focal plane. (Here the word normal is not defined in reference to a remote surface such as the target, but is defined as an imaginary line following along the axial center of each three- or four-ray interferometric light bundle and passing through the common intersection point.) The normals will correspond in direction to the meridional rays or light rays that travel along through the center of each formed channel. If this were not a feature of the design, the channels through the three dimensional honeycomb-like grid patterns could not normally be used to transmit light rays towards a common point. Also, there would be distortion in the grid pattern at target distances other than that for which the tail-end correctional optics were optimized. The normals (not shown) in FIG. 6 may be considered as the bisectors of the angles created by only two interfering light rays in each bundle because of the difficulty in graphically representing three or four rays in each bundle with its normal. Again, each bisector traces back to intersect the center point of the virtual focal plane.

In this lens system embodiment of the present invention, the real focal points are shown as having over twice the separation as the virtual focal points for the center aperture interferometric angles. Considering an off-axis beam angle of 0.595° and an effective focal length (EFL) for the objective lens section of 98.0392 mm, the separation between the real focal points is given by the formula:

$$\Delta = 2F \tan \theta$$

where $\Delta$ equals the separation between the real focal points, $\theta$ equals the half angle between the two beams, which in this case is the off-axis angle of a single beam, and F equals the EFL of the objective. $\Delta$ therefore equals 2.0363 mm. Although a development of algorithms and/or formulae to describe the first-order relationship between the actual system parameters and the virtual focal plane has not been done, a specific profiling analysis on a CODE V® lens design program (Optical Research Associates, Inc., Version 7.51, November 1992) indicates the virtual focal points to have a separation of 0.8605 mm if the real focal points have a separation of 2.0363 mm.

The interferometric angles that point further and further toward the periphery of the field are emitted from larger and larger virtual focal point separations in their relations to the increasing real focal point separations because, of course, the conventional lens design cosine rule for viewing an object at oblique angles from the point-of-view of the target surface has been circumvented.

Such large real focal point separations require either large off-axis beam angles through the objective and/or an objective with a long EFL. In order to preserve the spread angle of the cones of light which are directly proportional to the numerical aperture (NA) of an objective, an objective with a long EFL must be of a relatively large design, hence the large diameter of the beam from the illuminator section. Small objective lens systems, such as microscope objectives, cannot be used to generate a wide angle cone of light from a beam that is very far off-axis. Even medium-size objectives that could produce the focal point separations will generally have coma or other aberrational problems. However, large objectives will have a long EFL which makes it possible to produce the focal point separations with small input beam angles. This has the advantage that the light cones will have less spread angle overlap and therefore less light wasted resulting in a larger angular working area. For example, in the lens system described, which is designed to have cone spread angles of about 140°, if the off-axis angles of the beams from the holographic diffraction grating 10 are each 0.595° then an overlap on each side of the interferometric cones of 0.595° could be expected, which would keep the working area to slightly less that 139°. However, since any overlap was quite small at the distance from the center point of the virtual focal plane for which the optimization was chosen (27 mm), the overlap is not noticeable at this optimization of the lens design, which seems to have a 140° for the working area. Also, of greater necessity, is the requirement that the angles of the beams be kept within the scalar region for the design of the holographic diffraction gratings, which generate beams of very small off-axis angles.

The tail-end distortion correction lens elements incorporate somewhat of a "fish-eye" design. This represents an improvement over earlier designs in which the real focal plane and the virtual focal plane were one and the same. The real focal points became wider and wider spaced virtual focal points as the interferometric angles ranged further and further from the center axis towards the periphery of the field. The earlier designs required the objective section to emit much wider cone angles of light from each focal point and thus have a much higher NA. This resulted in appreciable coma problems at far off-axis focal points necessitating very large diameter objective lens elements in order to increase the EFL to correct the coma problems.

The tail-end distortion correcting lens elements proved to be difficult to design, and it became apparent that at least one of the elements should consist of a material of a very high refractive index such as zinc sulfide "water clear." Such high refractive index exotic materials generally have poor light transmission in the shorter wavelengths and would be virtually opaque in the UV. The tail-end elements in this type of design also seem to unavoidably extend further into the working area of exposure for optical bodies than the more "fish-eye" type designs, thus limiting the usefulness of the holographic projector system, especially in the case of a thick photosensitive eyeglass lens blank 23 that is exposed through the base. Photoresist coated domes smaller than a certain radius could not be exposed in this type of system. Still, the entire design, while pushing the limits of optics, is quite feasible for work in the blue and longer wavelengths.

Going the other direction in the design, towards more "fish-eye" type lens elements, and separating the real focal plane from the virtual focal plane even further, allows for a much lower NA for the objective section and relaxes the need for a large diameter illuminator input beam. However, in this case, the tail-end "fish-eye" elements have to do more light ray bending and again end up being pushed forward and further into the working area.

Another embodiment of the lens system is to use a more true "fish-eye" lens design and eliminate the focal points in the system altogether. In this case, the holographic diffraction grating 10 must be mounted far enough in front of the main lens system so as to allow the either three or four beams to fully separate, then cause the beams to converge again either with separate wedge prisms or with the wedge prisms built all in one piece like a flat pyramid. This has the advantage that the standing wave pattern size can be changed by using prisms with different facet angles. The unwanted diffraction orders from the holographic diffraction grating can largely be ignored as only the first order diffraction-beams will complete the angular pathways to the input lens of the "fish-eye" system. Also, the input beam from the illuminator section may be quite small in diameter.

The disadvantages are that the system is no longer compact and must be isolated from vibrations to a much greater extent than the earlier described embodiments, and with no pinholes, even slight spatial filtering to eliminate "noise" or ghost patterns cannot be done.

In the embodiment shown of the present invention in FIG. 6, the working area is only intruded upon by the distortion correcting lenses to a radius of 14.5 mm from the center point of the virtual focal plane. The radius describes the convex surface of lens element 21, which is hemispherically shaped and may be in direct contact with a refractive liquid in area 22 into which the photosensitive optical body 23 is immersed. If the refractive indices of items 21, 22, and 23 are all equally matched, then there will be no bending or reflection of the interferometric light rays when they transmit first into the refractive liquid in area 22 and then into the photosensitive optical body 23. This is of use in exposing a photosensitive optical body with an irregular surface such as an aspheric surface or an eyeglass lens blank where its radius or curvature is large and its surface is not concentric to the center point of the virtual focal plane as is the convex surface of lens element 21. Lens element 21 and refractive liquid 22 may be substituted for one solid piece of glass that fills the same volume and shape so that its outer convex surface will match the concave surface of the photosensitive optical body 23. A drop of refractive index matching oil may then be used when fitting the surfaces together.

Refractive liquid 22 is optional in the case where a photosensitive dome is to be exposed and its concave surface is placed so that its center of radius is at the center point of the virtual focal plane, although the lens system must then be designed for non-immersion (air) use. The convex surface of lens element 22 should then have an anti-reflection (AR) coating. If refractive liquid 22 is not used when exposing an optical body whose curvature is not concentric to the center point of the virtual focal plane, such as an internally photosensitive eyeglass lens, there will be both a slight changing of the pattern size and a shifting of the direction of the off-axis channels through the honeycomb-like grid pattern in the developed lens. Also, reflection may be more severe near the periphery of the lens, resulting in an uneven exposure. The channel direction shift will generally increase evenly across the surface of the eyeglass lens, from its center to its periphery, and thus change the center points of convergence of the normals as defined earlier, so that these intersection points will lie in a short distribution along the central axis of the lens system. In a viewer's use of the finished eyeglass lenses, visible light will bend both going in and coming out to a greater and greater degree the further to the periphery each light ray enters a lens. Because the channels are created by shorter laser (UV or blue) light than the average wavelength of visible light, the peripheral channels will be shifted slightly further than the route of the visible light. Thus for exposure of an optical body for eyeglass lens use, the non-immersed (air) system is preferable in that visible light which propagates through the formed channels and then refracts when emitted from the eyeglass lens will converge closely to a single focus or convergence point. The same is not true of an optical body exposed by a refractive liquid immersion system. Here either the tail-end lens system must be designed to cause a compensation in the direction of the formed channels or the emissive surface of the optical body must be changed, such as by grinding and polishing, to a specifically designed new surface to cause the emitted light to come to a focus or convergence point. Slight corrections in the channel direction shift may be made in the non-immersed (air) system by either modifying the design of the tail-end lens element assembly or by the addition of an extra correcting lens element between the holographic projector and the optical body or target.

Figure 7:
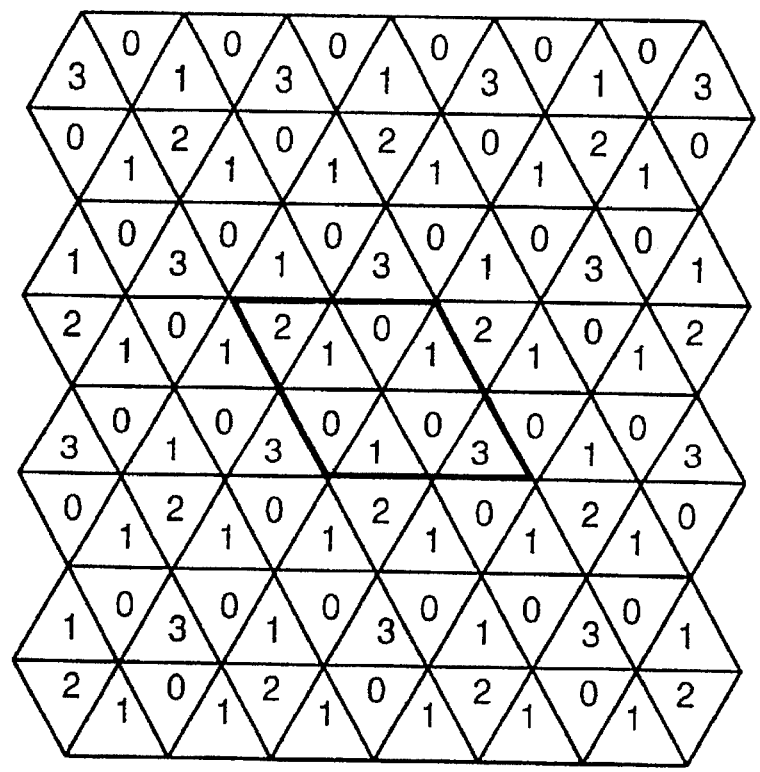
FIG. 7 is a construction diagram of a four phase-level holographic diffraction grating used in one design of the holographic projector system according to the present invention.

FIG. 7 shows a four phase-level holographic diffraction grating used in the holographic projector system for producing three equiangular beams which have a cross-sectional configuration as the apexes of an equilateral triangle. It is positioned at the pupil plane at 10 in FIG. 3. The design is optimized for the three first spectral order beams to each achieve a diffraction efficiency of 0.2500. The zeroth order diffraction efficiency is 0.0625 which with the first order beams amounts to a total energy fraction of 0.8125. The remaining fraction 0.1875, is distributed amongst unspecified higher orders.

The numbers 0, 1, 2, and 3 in the diagram refer to the four phase levels. They may be expressed as $0=0$, $1=2\pi/3$, $2=\pi$, and $3=5\pi/3$, which is in terms of radians, or by dividing by $2\pi/\lambda$, they are converted to $0=0$, $1=\lambda/3$, $2=\lambda/2$, and $3=5\lambda/6$, which is in wavelength, where $\lambda$ is equal to one wave of retardation. If the phase level is expressed in terms of radians, the etch depth of each phase level may be calculated by the formula:

$$\emptyset = (n-1)2\pi h/\lambda$$

where $\emptyset$ is the phase level in radians, n equals the refractive index of the grating material, 1 equals the refractive index of air, h equals the etch depth, and $\lambda$ equals the wavelength. Simplifying, the formula for phase level 1 would be:

$$(n-1)h = \lambda/3, \text{ or } h = \lambda/3(n-1)$$

The four phase levels are achieved in two etch steps by the use of two masks which are usually made by e-beam (electron beam) lithography. The first mask should be used for etching all triangles labeled "2" and "3" and the second mask should be used for etching all triangles labeled "1" or "3." The masks are fabricated by repeating a parallelogram-shaped unit cell which encloses eight triangles as is shown in heavy outline in FIG. 7. The grating period is equal to the width between the parallel sides of the parallelogram.

The material used for holographic diffraction grating in this type of application is generally fused silica or glass, such as BK-7. Fused silica transmits light well in both the visible and the UV and is generally etched by reactive ion etching (RIE) which gives a very predictable result. Glass, such as BK-7, is cheaper and transmits light well throughout the visible and for quite a ways into the UV. It gives excellent results when etched by ion milling which is a much slower and less versatile etching process than RIE.

The holographic diffraction grating 10 should be given an AR coating on both surfaces as are all the other lenses in the optical system (with the possible exception of the convex surface of lens element 21) if the feature sizes on the etched surface are large compared to the coating thickness. Thus the etched surface of the holographic diffraction grating may be given a multilayer AR coating if feature sizes are no smaller than perhaps 15 or 20 microns and a single layer AR coating if the feature sizes are no smaller than perhaps 5 or 10 microns. Without the AR coating, Fresnel losses are typically about 4% per surface or an 8% loss on the two surfaces.

Figure 8:
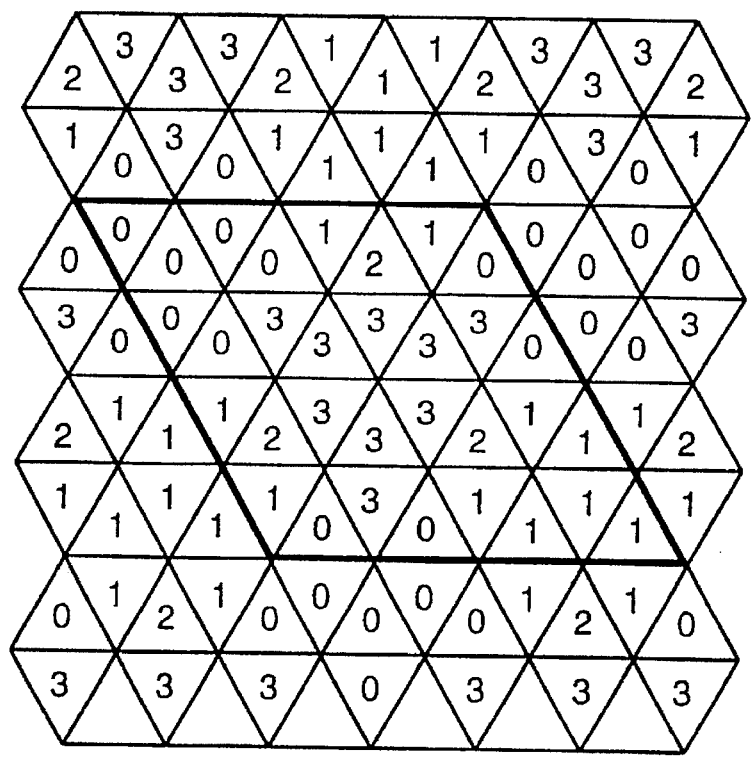
FIG. 8 is a construction diagram of a three phase-level holographic diffraction grating also used in one design of the holographic projector system according to the present invention.

FIG. 8 shows a three phase-level holographic diffraction grating which produces the same equiangular three beam array as the holographic diffraction grating of FIG. 7. Its design eliminates the zeroth order but it is more complex to fabricate. Also, each first order diffraction efficiency is slightly less at 0.246423 for a total first order diffraction efficiency of 0.739269, and when fabrication errors are considered, this design may have a zeroth order efficiency of a few percent. The phase depths are now 0=0.0, 1=0.295167, 2=0.647584, and 3=2=0.647584, where 1.0 equals one wave of retardation. The etch depth of the first phase level would be calculated as:

$$h(n-1)/\lambda = 0.295167, \text{ or } h = \frac{0.2951671}{n-1}$$

The design now has 32 triangles for each parallelogram shaped repeatable cell as is shown in heavy outline in FIG. 8. When fabricating, the first mask should be used to etch all triangles labeled "1" and the second mask should be used to etch all triangles labeled "2" or "3." It is interesting to note that since phase depth 2 is the same as phase depth 3, the patterning of the second mask will consist entirely of a field of regular six-pointed stars which also prominently appear in the finished holographic diffraction grating. The grating period is equal to the width between the parallel sides of the parallelogram enclosing the 32 triangles. Since the feature sizes are proportionally much smaller than in the holographic diffraction grating of FIG. 7 more consideration must be given to the scalar region used in the design application. Generally, the smallest practical size for etched features is about 3 or 4 microns, although with extremely precise mask alignment, the practical limit may be extended to about one micron sized features. More complex designs utilizing more phase levels which produce higher efficiencies are possible, but the fabrication may then prove impractical. Some solutions will add a little to the efficiency, but it will be lost in fabrication error such as line width increase causing light scatter. If the wavelength used is different than that for which the holographic diffraction grating is designed, the first order efficiency decreases and the zeroth order efficiency increases.

The relationship between the grating period and the emitted beam angles is expressed in the following formulae:

$$d = \frac{m\lambda}{\sin\Theta_m}, \text{ or } \Theta_m = \sin^{-1}\frac{m\lambda}{d}$$

where d equals the grating period, $\Theta_m$ equals the diffraction angle of the mth beam, m equals the diffraction order, and $\lambda$ equals the wavelength of the light.

At the target or photosensitive substrate level of the holographic projector system, the relationship between the angle of convergence of two interfering light beams and the fringe spacing or distance between intensity maxima, which form long diverging standing wave patterns, is given by the formulae:

$$\Psi = \sin^{-1}\frac{\lambda}{2D}, \text{ or } D = \frac{\lambda}{2\sin\Psi}$$

Where $\Psi$ equals the half angle of convergence between the incident beams, D equals the fringe or intensity maxima spacing, and $\lambda$ equals the wavelength of the light.

Example: in an equiangular three beam system operating at a wavelength of 363.789 nm, if a hexagonal-like pattern with a fringe spacing of 16 microns (width between the sides of the hexagons) at a distance of 27 mm from the center point of the virtual focal plane is desired, this corresponds to a virtual focal point spacing of 0.6139 mm which in turn corresponds to the distance between any two apexes of an equilateral triangle. The distance from an apex of the triangle to its center then becomes 0.3545 mm. If the required off-axis beam angle (the angle between each beam and the central axis of the lens system or the angle between the first and zeroth order diffractions of the grating) to create a specific off-axis real focal point distance which in turn generates an off-axis virtual focal point distance of 0.3545 mm is 0.47725°, then the required grating period of the holographic diffraction grating is 43.67 microns.

Figure 9:
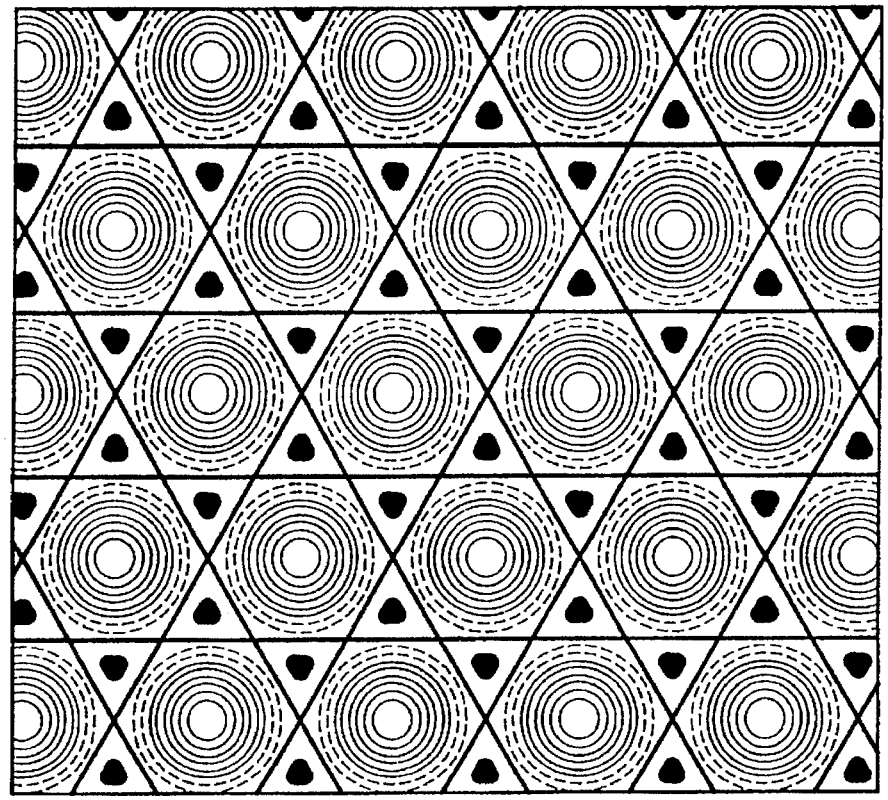
FIG. 9 is a two-dimensional computer plot of the intensity pattern resulting from the use of the holographic diffraction grating of either FIG. 7 or FIG. 8 in the holographic projector system.
Figure 10:
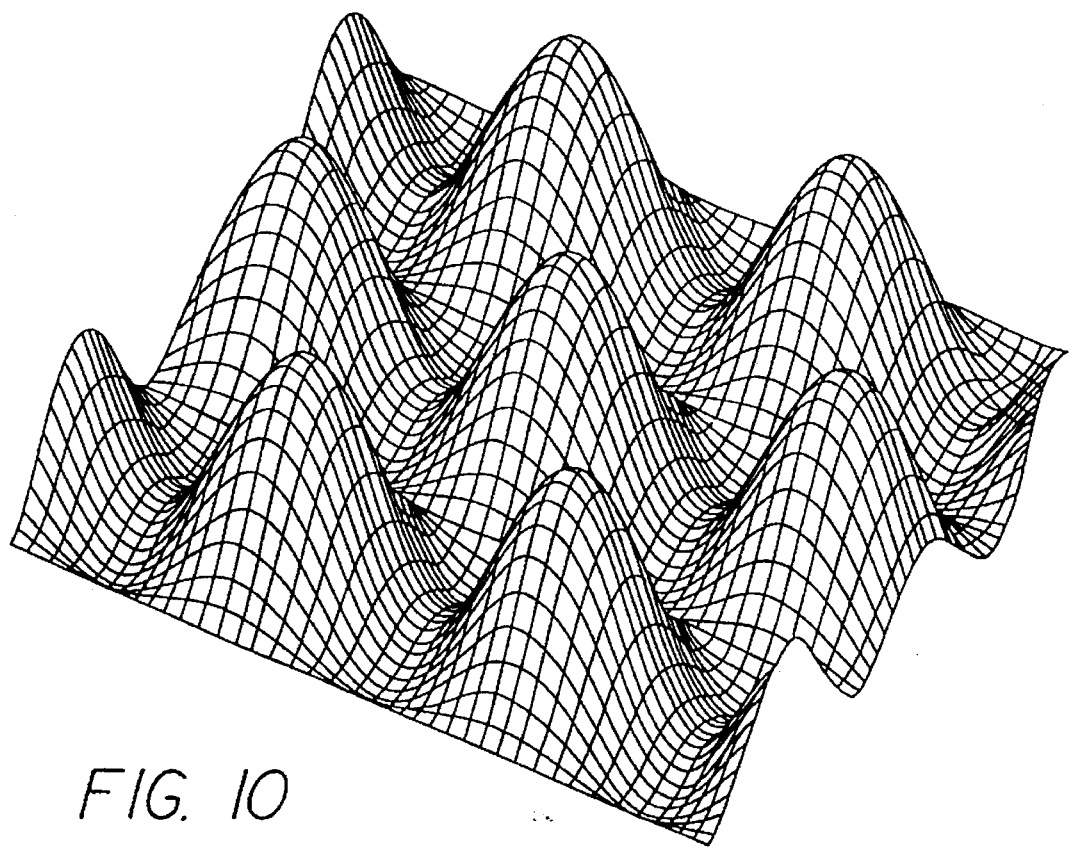
FIG. 10 is a three-dimensional computer generated perspective view of the intensity pattern of FIG. 9.

FIG. 9 is a two-dimensional computer plot of the equiangular three beam standing wave pattern with a regular array of intensity antinodes. Viewed like a topical map, each time a line is crossed, the intensity changes by one unit. From the center of each periodic spot or intensity maxima to the surrounding areas of zero or low intensity, approximately nine lines are crossed, making the areas of constructive interference nine times more intense than the areas of destructive interference. FIG. 10 is a three-dimensional computer generated perspective view of the intensity pattern of FIG. 9, spatially illustrating the antinodal intensity peaks.

Figures 11, 12:
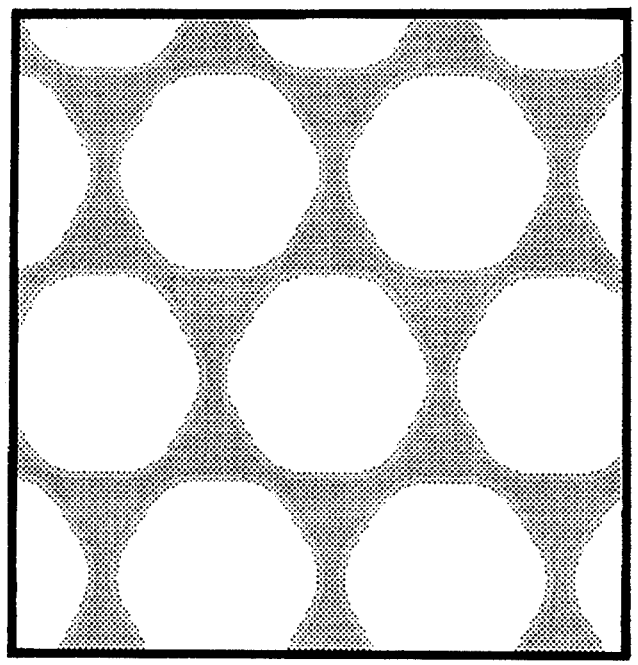
FIG. 11 depicts a cross-sectional view of the intensity pattern of FIGS. 9 and 10 as recorded in an optical body of the present invention.
FIG. 12 is a construction diagram of a two phase-level holographic diffraction grating used in another design of the holographic projector according to the present invention.

FIG. 11 depicts a cross-sectional view of the intensity patterns of FIGS. 9 and 10 as recorded in an optical body (such as an eyeglass lens 23) of the present invention. It is also representative of the grid pattern obtained in a photoresist-coated substrate after exposure, development, and etching. However, in the latter case, increased etching will result in a narrowing of the grid pattern walls producing a thinner-walled, closer packed pattern with a rounder shape to the hexagons. The saddle areas between the hexagons also tend to disappear. In an internally recorded image system, increased exposure will also have a tendency to produce this effect.

FIG. 12 shows a two phase-level holographic diffraction grating used in another design of the holographic projector system of the present invention. This holographic diffraction grating produces four equiangular beams in a cross-sectional configuration as the corners of a square. This design removes the zeroth order and has a diffraction efficiency of 0.164256 for each of the four first spectral order beams, for a total first order diffraction efficiency of 0.657024.

The phase levels are 0 and 1, where, in radians, 0=0 and 1=π. Therefore, the etch depth may be calculated as:

$$(n-1)h = \lambda/2, \text{ or } h = \frac{\lambda}{2(n-1)}$$

The design is like a checkerboard, with either all light squares or all dark squares etched by the use of a single mask, leaving the other squares unetched. Each cell is a square enclosing four smaller squares as is shown in FIG. 12 in heavy outline. The grating period is equal to the width of a cell or the width of two small squares. In actual fabricated holographic diffraction gratings of this design, the total first order diffraction efficiency is generally around 60% for small (e.g., 10 microns) grating periods. Careful etching can keep the zeroth order efficiency to less than 1%.

Figures 13, 16:
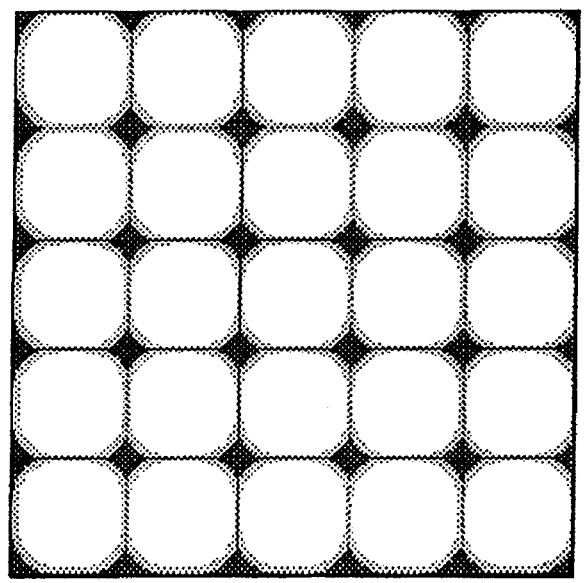
FIG. 13 is a construction diagram of a four phase-level holographic diffraction grating also used in another design of the holographic projector according to the present invention.
FIG. 16 depicts a cross-sectional view of the intensity pattern of FIGS. 14 and 15 as recorded in an optical body of the present invention.

FIG. 13 is a diagram of a four phase-level holographic diffraction grating which produces the same equiangular four beam array as the holographic diffraction grating of FIG. 12. Its main difference is that it is more efficient but more difficult to fabricate. This design also removes the zeroth order and has a diffraction efficiency of 0.202642 for each of the four first spectral order beams, for a total first order diffraction efficiency of 0.810568. At four phase levels, it represents an optimal point, as there is no additional improvement in the first order diffraction efficiency for either eight or sixteen phase levels.

The four phase levels in the diagram, 0, 1, 2, and 3, in radians are 0=0, 1=π/2, 2=π, and 3=3π/2. When fabricating, the first mask should be used for etching all squares labeled "2" or "3" and the second mask should be used to etch all squares labelled "1" or "3." Again, each cell is a square enclosing four smaller squares as is shown in FIG. 13 in heavy outline. The grating period is equal to the width of a cell or the width of two small squares. The angles of the four beam array holographic diffraction gratings are calculated in a manner similar to that of the three beam array gratings.

Example: in an equiangular four beam system operating at a wavelength of 363.789 nm, if a square-like pattern with a fringe spacing of 16 microns (width of the square—squares will have rounded corners) at a distance of 27 mm from the center point of the virtual focal plane is desired, this corresponds to the distance between two diagonally-opposed virtual focal points of the four beam array which is 0.6139 mm (the diagonally-opposed beams interfere to produce parallel fringe patterns which correspond to the sides of the square-like pattern). The distance from a virtual focal point to the central axis of the lens system is then half of this distance or approximately 0.3070 mm. If the required off-axis beam angle to create a specific off-axis real focal point distance which in turn generates an off-axis virtual focal point distance of approximately 0.3070 mm, is 0.42983°, then the required grating period of the holographic diffraction grating is 48.49 microns.

Figure 14:
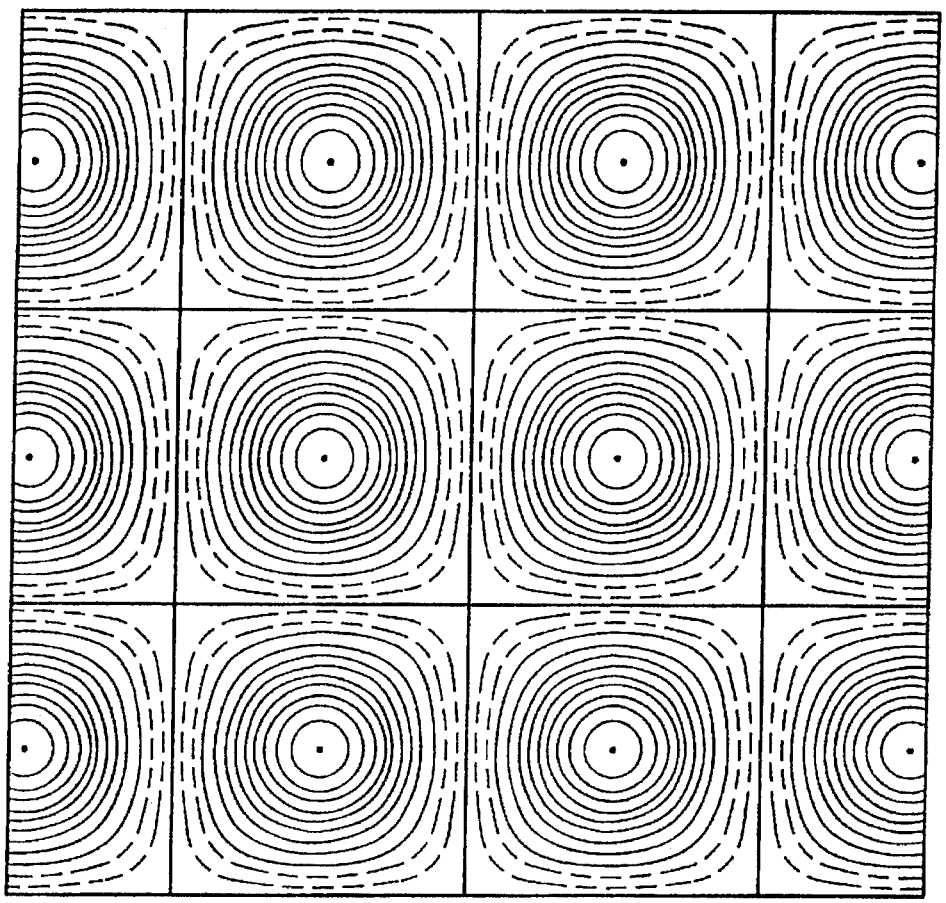
FIG. 14 is a two-dimensional computer plot of the intensity pattern resulting from the use of the holographic diffraction grating of either FIG. 12 or FIG. 13 in the holographic projector system according to the present invention.

FIG. 14 is a two-dimensional computer plot of the equiangular four beam standing wave pattern showing a regular array of intensity modulations. Again, like a topical map, each time a line is crossed, the intensity changes by one unit. From the center of each periodic spot or intensity maxima to the surrounding areas of zero intensity approximately sixteen lines are crossed making the areas of constructive interference sixteen times more intense than the areas of destructive interference near the edge of the surrounding area. At the edge, completely surrounding each intensity maxima is an area of zero intensity so that the intensity ratio from the center to the edge is infinity, which makes the four beam system especially useful for high depth applications.

Figure 15:
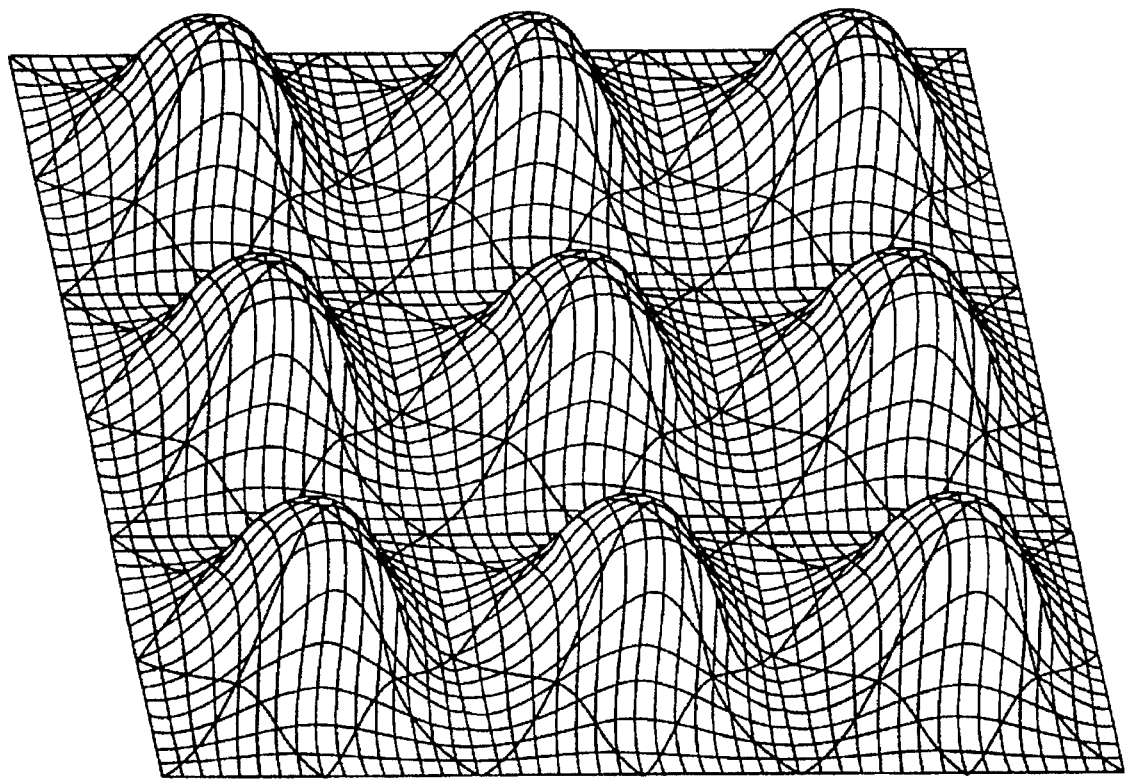
FIG. 15 is a three-dimensional computer generated perspective view of the intensity pattern of FIG. 13.

FIG. 15 is a three-dimensional computer generated perspective view of FIG. 14, spatially illustrating the antinodal intensity peaks.

FIG. 16 depicts a cross-sectional view of the intensity patterns of FIGS. 14 and 15 as recorded in an optical body (such as an eyeglass lens 23) of the present invention. It is also representative of the grid pattern obtained in a photoresist-coated substrate after exposure, development, and etching. Again, either increased exposure, or in the case of a photoresist-coated substrate, increased etching or both increased exposure and increased etching will tend to make the exposed areas larger in relation to the walls of the grid, which will become narrower.

If an optical body, such as an internally photosensitive eyeglass lens is exposed in the holographic projector system followed by development, the result will be a three-dimensional image which is produced within the lens which corresponds to the walls of either a hexagonal-like or square-like honeycomb whereas the rest of the lens will transmit light readily. In eyeglass use, the honeycomb ranges or projects through the lens away from the optical center of the eye. These telescoping walls of the honeycomb absorb any light that has an angle of incidence greater than those angles of light acceptable through the transmissible channel areas. The honeycomb-like image is produced so finely that it is not readily noticeable to the wearer of the eyeglasses. Therefore, the pattern size should not be much larger than 50 microns across, with a more ideal range being perhaps 5 to 30 microns across.

Because of this absorbing or piping effect, depending on the density of the image, the outside observer will see the honeycomb-like image rather than the eyes, since the channels in the lenses point towards the pupils. By adjusting the lens position relative to the holographic projector system during its manufacture, the honeycomb-like grid will converge towards a desired focus or convergence point.

Figure 17:
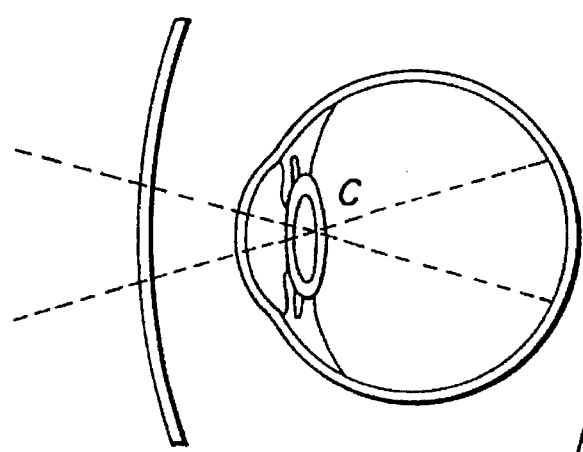
FIG. 17 depicts a diagrammatic cross-section of the human eye with its optical center at C and its correspondence with an optical body with its focus or light convergence point also at C according to the present invention.

FIG. 17 depicts a diagrammatic cross-section of the eye with its optical center at C and its correspondence with a patterned lens with its focus or light convergence point also at C according to the present invention. By varying the depth and size (aspect ratio) and azo dye density of the grid image, a certain amount of tolerance may be built into each lens so that when the lenses are installed in an eyeglasses frame, the alignment within the frame and the frame distance from each eye may be varied slightly with no noticeable deficiency in visual effect. This also allows for the fact that when an eye rotates in its socket, there is neither a fixed point within the eye nor in the orbit around which the eye rotates in assuming any one position. However, for practical purposes, there may be assumed to be a center of rotation, which makes it possible for the eye to move back and forth and observe the same effect over any part of the lens.

Since the exposure method is holographic, any shape photosensitive lens may be used and it may be placed at any position or at any tilt angle in the working area of the holographic projector system. One may think of the working area as a three-dimensional mass of focal points, so that the honeycomb-like image is always "in focus."

In the present invention, the target may consist of a photoresist-coated substrate which when either developed or developed and etched will result in a relief image. The target may also consist of an internally photosensitive optical body which will record images by either creating a volume-phase hologram (transmittance function modulated by the permittivity [index of refraction]) or a volume-absorption hologram which contains areas that occlude or absorb light. As a volume-phase holographic photosensitive system, dichromated gelatin (DCG) consisting of gelatin containing either ammonium dichromate or potassium dichromate has long been in use because of its excellent holographic properties, including low light scatter and high index modulation. Other systems include commercial holographic films composed of sensitizing dye, an initiator, acrylic monomers, and a polymeric film-forming binder of which the OmniDex® holographic recording films (E.I. du Pont de Nemours & Company, Inc.) are a prime example. They are new compositions derived from the original DuPont photopolymers (see U.S. Pat. No. 3,658,526 (1972)), but with substantial changes and improvements (see also U.S. Pat. No. 4,959,283 (1990)). The image is recorded at a wavelength for which the chosen sensitizing dye is sensitive. This may be in the ultraviolet (UV) and across the visible (VIS) spectrum. The film is then given a brief UV cure followed by heating in an oven to increase the refractive index of the hologram. The fringe structure consists of photopolymer-rich regions formed by monomer polymerization in constructive interference areas with binder-rich regions formed by monomer diffusion in destructive interference areas, creating a refractive index differential between the areas. Thus a fiberoptic effect may be achieved through total internal reflection within the channels.

Light occluding or absorbing systems include silver halide, leuco dye, diazo process, and various other photographic recording methods. Although negative acting systems, such as silver halide, where the areas of exposure become opaque or absorbent in the developed substrate have some utility, positive acting systems in which the non-exposed areas become absorbent are preferred in the present invention for use in the photosensitive optical body. Such a system is the aromatic diazonium salt-acid-coupler combination known as diazo process, which, when the diazo material is not decomposed by light, forms an azo dye when the pH is raised to basic. Moist ammonia gas is usually the developing agent, although other methods such as a wet system where a basic solution (which may contain the coupler) is used as the developer, or a heat development method in which the components are mixed together previously and coupling is effected by heating, have also been widely used. Diazo process also has very high resolution. Whereas a gelatino-silver image is composed of inorganic particles typically about 3000 angstroms (Å) diameter, the diazo process image is an organic azo dye typically about 15 Å in size.

Aromatic diazonium salts which are commonly used include: 1-diazo-4-N,N-dimethylaminobenzene chloride ½ zinc chloride, 1-diazo-4-N,N-diethylaminobenzene chloride ½ zinc chloride, 1-diazo-4-(N-ethyl-N-hydroxyethyl) aminobenzene 5-sulfoisophthalic acid salt, 1-diazo-3-chloro-4-(N-cyclohexyl-N-methylamino)benzene hexafluorophosphate, 1-diazo-2-chloro-4-diethylamino -5-p-chlorophenoxybenzene chloride ½ zinc chloride, 4-diazo-diphenylamine sulfate, 1-diazo-4-(N-benzyl-N-ethylamino)benzene tetrafluoroborate, 1-diazo-4-morpholinobenzene chloride ½ zinc chloride, 1-diazo-2,5-diethoxy-4-morpholinobenzene bisulfate, 1-diazo-2,5-diisopropoxy-4-morpholinobenzene tetrafluoroborate, 1-diazo-2,5-dibutoxy-4-morpholino -benzene hexafluorophosphate, 1-diazo-2,5-diethoxy-4-p-tolylmercaptobenzenetetrafluoroborate, 1-diazo-3-methyl-4-pyrrolidinobenzene tetrafluoroborate, and 1-diazo-3-chloro-4-pyrrolidinobenzene chloride ½ zinc chloride. (The particular salt forms of the compounds listed here are shown as examples of their variability. The salt forms are interchangeable).

Commonly used couplers and the colors they form include: 4-chlororesorcinol (red-brown), 2,3-dihydroxynaphthalene (purple-brown), diresorcinol sulfide (brown), 1,4-bis-acetoacet-ethylenediamine (yellow), 1-hydroxynaphthalene-4-sulfonic acid sodium salt (violet), 2,7-dihydroxynaphthalene-3,6-disulfonic acid disodium salt (blue), phloroglucinol (magenta), 1-phenyl-3-methyl-5-pyrazolone (red), 2-hydroxynaphthalene-3,6-disulfonic acid sodium salt (blue), resorcinol (brown), α-resorcylic acid ethanolamide (red), β-resorcylic acid ethanolamide (brown), 3-hydroxyphenylurea (yellow), acetoacetanilide (yellow), β-resorcylic acid (yellow), and 2-hydroxynaphthalene-3-carboxylic acid methyl ester (blue). Other colors or black may be created by mixing two or more couplers into the diazo process mixture.

Commonly used acids to inhibit coupling include citric acid, tartaric acid, boric acid, 5-sulfosalicylic acid, and p-toluenesulfonic acid. Antioxidants such as thiourea and 1,3,6-naphthalene trisulfonic acid sodium salt are often used to inhibit image discoloration and fading. Caffeine is often used to enhance solubilization of the diazo process mixture.

Figure 18:
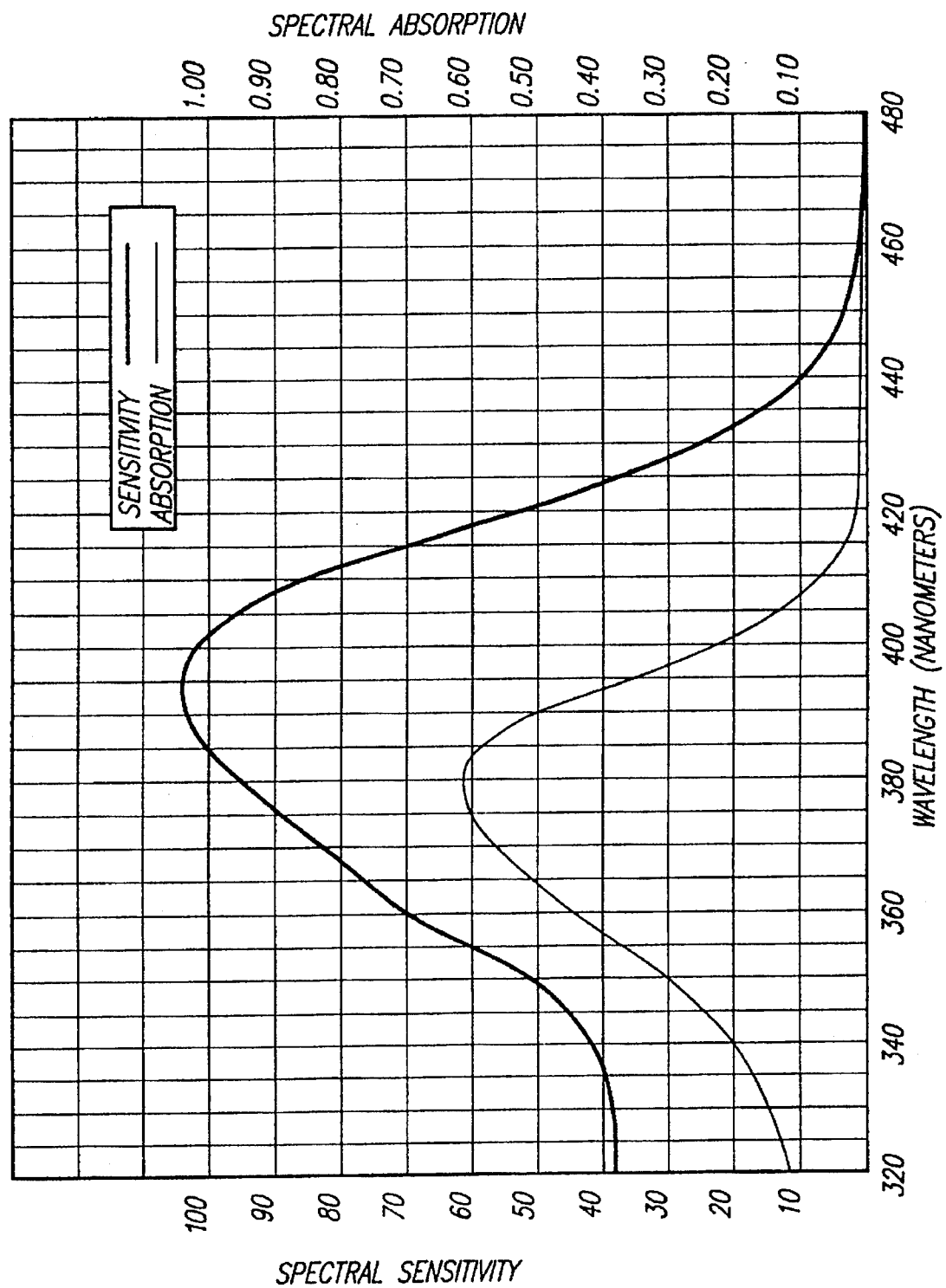
FIG. 18 shows both spectral sensitivity and spectral absorption of p-diazo-N,N-diethylaniline salts through a range of wavelengths.

Aromatic diazonium salts of the type listed generally have their peak spectral sensitivity between 385 nm and 405 nm. Typical are the salts of 1-diazo-4-N,N-diethylaminobenzene for which FIG. 18 shows both the spectral sensitivity and the spectral absorption through a range of wavelengths. It can be seen by this graph that there will be perhaps eight times more sensitivity for a holographic exposing system with a laser operating at 363.789 nm than with a laser operating at 441.567 nm. One notable exception are salts of 1-diazo-3-methyl-4-pyrrolidinobenzene which have a peak spectral sensitivity around 420 nm. Although aromatic diazonium salts have been discovered which have spectral sensitivities far into the visible (VIS) spectrum (see Ger. (East) DD Pat. Nos. 206,002 (1984) and 250,592 (1987) (C.A. 101:46366f and 109:46278u)), their spectral absorption usually closely follows their spectral sensitivity and they will have a deep orange or still darker coloration that does not always photolysize to a colorless compound. Also they tend to be faster compounds and are responsible for far more background discoloration problems in stored developed images. This is due to the formation of colored products from decomposition substances and self-coupling or unspecified coupling of unreacted diazo material. Experience in the diazo industry has shown that the conventional UV sensitive diazonium salts have the best performance.

According to the present invention, the diazo process mixture may be put into a resinous binder or film former which forms a coating over a transparent base substrate. The thickness of the coating should be at least 50 to 200 microns, and if the development process permits, it may be much thicker. The coating or resinous binder may be composed of such materials as gelatin, cellulose acetate propionate, cellulose acetate butyrate, and polymeric organic resins such as polyvinyl alcohol, polyvinyl acetate, polyvinyl chloride, vinylidene copolymers, styrene and maleic acid copolymer, vinyl chloride and maleic acid copolymer, vinyl acetate and crotonic acid copolymer and styrene and butadiene or butadiene acrylonitrile copolymer. Hydrogels such as polydimethylsiloxane and its derivatives may be used as may epoxide bonding materials in which the diazo process mixture is added and the substance allowed to harden as a cast coating.

The transparent base substrate may be glass or polymeric resins including polyethylene terephthalate (Mylar® or Cronar®) or hard optical plastics such as polymethylmethacrylate (Plexiglas®), poly(4,4'-dioxydiphenol-2,2-propane) (Lexan®), or diethylene glycol bis(allylcarbonate) polymer (CR-39®).

The preferred developing method is by the use of moist ammonia gas. A short treatment with moist ammonia vapor in a closed container may be sufficient for thin films that are highly gas permeable. Thick films or plastics with a hard matrix or cross-link density into which the diazo process mixture lies deeply may require several hours of moist ammonia gas under high pressure conditions. This may be done in a high pressure apparatus such as a Paar hydrogenator. If heat is also applied, the temperature should be kept moderate, no higher than perhaps 50° or 60° C. because of diffusion of the azo dye formed destroying the image if the plastic gets too softened.

Another useful process according to the present invention is that of reverse vesicular diazo. In a direct vesicular diazo process, a diazo compound is mixed with a thermoplastic resin. Upon photolysis of the diazo compound, which serves as a sensitizer, nitrogen gas is released under pressure. When the material is heated, the gas expands and forms microscopic vesicules or bubbles in the resin binder. The vesicules or bubbles in the binder cause light scattering and constitute the image. Usual development temperatures range from 93° to 140° C. and the developed images have high resolution.

Reverse vesicular diazo, where the image is reversed (see U.S. Pat. No. 3,120,437 (1964)) is accomplished by allowing the gas to diffuse from the exposed areas before development and then re-exposing the material. Upon heat development, the released gas forms bubbles in the areas which were previously unexposed, resulting in a positive image. Useful binders include polyvinyl chloride, polyvinylidene chloride and polystyrene. Useful copolymers include those of acrylonitrile and vinyl chloride, styrene, vinylidene chlorofluoride, and 1,1-difluoroethylene. Other copolymers are of vinyl chloride and methyl acrylate, acrylic acid, diethyl maleate, and vinyl acetate. The properties of the binder, such as rigidity, gas diffusibility and permeability may be controlled by a modifier; for example, the copolymer of vinylidene chloride and acrylonitrile (Saran F-120®), may be modified by the inclusion of polymethylmethacrylate. Useful sensitizers include any of the previously mentioned aromatic diazonium salts, especially 1-diazo-4-N,N-dimethylaminobenzene chloride ½ zinc chloride, 1-diazo-4-N,N-diethylaminobenzene chloride ½ zinc chloride, and 4-diazo-diphenylamine sulfate.

A combination of an azo dye image and a reversed vesicular image may also be used. In this scheme, a mixture of a diazo compound, an acid, and a coupler is put into the binder. The exposed image is either underdeveloped with ammonia gas or a less than stoichiometric or equimolar proportion of the coupler is used in the mixture, so that in either case some unreacted diazo compound is left in the unexposed regions. After allowing the nitrogen in the exposed areas to diffuse out, the material is re-exposed by very intense actinic light to penetrate where the formed azo dye image is weak. (The channels through the honeycomb-like pattern aid in this procedure). It is then heat developed to produce a reversed vesicular image in the same regions as the azo dye image. The heating process must be done rapidly to prevent diffusion of the azo dye image.

In a preferred embodiment of the present invention, a modified diazo process mixture is thermally dispersed into the subsurface region of an optical plastic by a phase transfer from a carrier resin in a process similar to that used for the manufacture of photochromic eyeglass lenses (see U.S. Pat. No. 4,880,667 (1989)). Here a thin, substantially dry homogeneous film of a polymeric organic resin having an aromatic diazonium compound along with an acid and one or more dye forming couplers dissolved therein is applied to at least one surface of a transparent synthetic plastic material to be known as the optical body. The optical body to which the film is applied may be planar or non-planar, such as the convex and/or concave surfaces of a lens. The film may be applied to one or both surfaces of the optical body.

The film should be of a substantially uniform thickness with no defects such as streaks, blotches, or spots. The thickness is not critical but will commonly be 25 to 100 microns. The film should be sufficiently thin to allow the dissolved substances to permeate or diffuse from the film into the interior of the optical body upon heating for a substantial period of time. If the film is too thick, the required temperature and time may be excessive and cause a decomposition of the diazo process mixture, especially the aromatic diazonium compound.

The concentration of the diazo process mixture used in the carrier resin may be varied according to the required depth and intensity of the holographic image, the time and temperature used for transfer, and the solubilities of the individual components of the diazo process mixture in both the carrier resin and the optical body. Polymeric carrier resins which may be used include cellulose acetate propionate, cellulose acetate butyrate, polyvinyl chloride, polyvinyl acetate, polyurethanes, polyvinyl butyral, polyvinyl propionate, vinyl acetate-vinyl chloride copolymer, and vinyl chloride-vinylidene chloride copolymer. Preferable solvents used include toluene, xylene, methylethylketone, methylisobutylketone, and mixtures thereof. The same type of solvent is used to remove the spent film coating after the heating process.

The preferred method of application is spraying, although brushing, dipping, or spin coating may also be used. The desired thickness may be fairly accurately achieved by the application of multiple thin coatings. Before coating, the intended application surfaces of the optical body should be clean. A vapor degreaser or ultrasonic bath, containing any of a number of organic cleaning solvents that do not solvate the plastic may be used. After application of the resin film containing the diazo process mixture it is allowed to dry at room temperature before it is evenly heated, preferably in a convection-air oven. The heating period is typically between ½ to 2 hours.

The transfer temperature generally must be over 100° C. but also must be kept well below the decomposition temperature of the diazo process materials. The diazonium salt is usually the most sensitive to heat so it becomes the primary consideration. 1-diazo-2,5-diethoxy-4-p-tolylmercaptobenzene tetrafluoroborate has a melting-decomposition temperature of 148°–153° C. whereas 1-diazo-4-(N-benzyl-N-ethylamino)benzene tetrafluoroborate has a melting-decomposition temperature of 152°–160° C. It has been rated as having a constant stability temperature of 111° C. Many of the 5-sulfoisophthalic acid salts of this type of diazonium compounds have melting-decomposition temperatures of 165°–170° C. (see U.S. Pat. No. 4,403,028 (1983)). However, none of the aforementioned aromatic diazonium salts are soluble in most heated optical plastics. The solubility of the diazonium compound therefore also becomes a prime consideration.

In the present invention, a preferred plastic resin is CR-307® (PPG Industries, Inc.) It was developed for use in photochromic eyeglass lenses and is very similar to CR-39® (PPG) which is used in about 60% of all eyeglass lenses sold in the United States. CR-39® is composed of diethylene glycol bis(allyl carbonate) polymer. CR-307® is composed of the same polymer except that its composition also contains about 20% of a diacrylic urethane copolymer. The added copolymer in CR-307® results in a slightly softer matrix or lower cross-link density which makes it ideal for the thermal transfer process. Compounds may generally be thermally imbibed into its subsurface to a depth of about 150 microns by heating at 130° for about ½ hour. The cross-link density may be made even softer near the surface resulting in even more receptivity to thermal transfer by incomplete curing of the plastic when it is manufactured. This is done by demolding or prematurely removing the plastic from its mold and post-curing it in air. The air affects the catalyzation of the curing agent near the surface of the plastic. Thus, if the Barcol hardness (a common plastic industry measurement) is 10 to 15, the thermal transfer conditions can be far less severe to cause a fair amount of material to enter the plastic than if the Barcol hardness is 20 to 25, in which case very little material may enter the plastic under the same thermal conditions. Thermal transfer conditions for normally cured CR-307® are generally from 100° to 150° C. for compounds that are stable at these temperatures.

A sample of CR-307® was tested and found to have refractive indices of 1.4997±0.0005 at 589.30 nm (sodium D wavelength), 1.5085±0.0005 at 457.935 nm, 1.5102±0.0005 at 441.567 nm, and 1.5223±0.0005 at 363.789 nm. The light transmission of CR-307® at 363.789 nm is just under 90% for a 7 mm thick piece, and its Abbé $v_D$ is equal to 57.5 and its dispersion ($n_F-n_C$) is equal to 0.008690. CR-39® has a fairly non-polar matrix and its solubility parameters are very similar to that of toluene. The same is true of CR-307®. Solubility in toluene, therefore, makes a good test as to whether or not a substance will thermally transfer into CR-307®.

The generally available aromatic diazonium salts, such as those previously listed, are not soluble in toluene because they are far too polar, that is, they have too large a charge separation between the cation portion and the anion. In order to induce solubility in toluene, an anion must be selected to make the compound more covalent and/or a functional group must be added to the molecule to balance the large charge separation. The selection of the hexafluorophosphate anion helps a great deal (see U.S. Pat. No. 3,203,803 (1965)). The diazonium hexafluorophosphate salts are fairly insoluble in water, but dissolve readily in polar organic solvents such as methylethylketone. The hexafluorophosphate salt plus the addition of a long-chain aliphatic group to the molecule overcomes the problem. Such a compound is 1-diazo-4-octyloxybenzene hexafluorophosphate. It is readily soluble in toluene and will thermally transfer into CR-307® at around 120° C. It may be prepared from commercially available p-octyloxyaniline by the following procedure:

p-Octyloxyaniline (11.1 g, 0.05 mol) is dissolved into a solution of 30 ml conc. HCl and 60 ml water. The temperature of the mixture was then decreased to 0° C. With constant stirring, $NaNO_2$ (3.7 g, 0.053 mol) dissolved in 10 ml of water was gradually added at a rate sufficient to maintain the reaction mixture at 5° C. After addition of the nitrite, the reaction mixture was agitated for 10 min. $NaPF_6$ (10.1 g. 0.06 mol) dissolved in 50 ml water was then slowly added. The diazonium salt immediately precipitated.

Other useful salts are the 5-sulfoisophthalic acid salts and the 4-sulfophthalic acid salts, both good for thermal stability although in many cases their non-polar solvent solubilities are poor (see U.S. Pat. No. 4,403,028 (1983)) and the tetraphenylborates (see Jpn. Kokai Tokkyo Koho Jp 58,212, 984 [83,212,984] (1983) (C.A. 101:201639t)). The hexafluoroarsenate and hexafluoroantimonate salts (see Ger. Offen. Pat. 2,314,199 (1973) (C.A. 80:54519w)) are very similar to hexafluorophosphates in their solubility and hydrophobic nature but they are toxic and thus have received little commercial attention.

Other aromatic diazonium compounds valuable for thermal transfer purposes are 1-diazo-2,5-diethoxy-4-(p-octyloxyphenylmercapto)benzene hexafluorophosphate and 1-diazo-4-N,N-dioctylaminobenzene hexafluorophosphate, both of which are described with their preparation in Jpn. Kokai Tokkyo Koho JP 61,172,856 [86,172,856] (1986) (C.A. 106:157954u). 1-diazo-4-(N-methyl-N-octyl) aminobenzene hexafluorophosphate may be prepared in the same manner as the latter mentioned diazonium compound by substituting N-methyl-octylamine for the N,N-dioctylamine with the same molar proportion. Similarly, 1-diazo-2,5-diethoxy-4-N,N -dioctylaminobenzene hexafluorophosphate may be prepared by substituting 2,5-diethoxy-4-chloronitrobenzene for the 4-chloronitrobenzene in the 1-diazo-4-N,N-dioctylaminobenzene hexafluorophosphate synthesis using the same stoichiometry. 1-diazo-2,5-dioctyloxy-4-p-tolylmercaptobenzene hexafluorophosphate and 1-diazo-2,5-dioctyloxy-4-morpholinobenzene hexafluorophosphate may each be prepared by first starting with 1,4-dioctyloxybenzene and chlorinating it followed by nitration to give 2,5-dioctyloxy -4-chloronitrobenzene by the method described in Pol. Pat. 68,097 (1973) (C.A. 80:95972g). This compound is then used to synthesize both of the diazonium compounds by following the methods of the previous patent. Additional information and methods of synthesis are given in *Azo and Diazo Chemistry*, by H. Zollinger, Interscience, New York, 1961 and *The Aromatic Diazo Compounds*, by K. H. Saunders, E. Arnold and Co., London, 1949.

Again, these diazonium compounds may be prepared with salts other than the hexafluorophosphate. The long chain aliphatic group may constitute a normal alkyl group with from 5 to 12 carbon atoms—pentyl, hexyl, heptyl, octyl, nonyl, decyl, undecyl, and dodecyl. One or more may be substituted in one or more places on the molecule and generally will form an ether, a thioether, part of an amine, or will be connected directly to a benzene ring carbon atom.

The coupling inhibiting acid should also have a high solubility in toluene and not be too volatile. The diazo process mixture should be well stabilized with acid to prevent premature coupling at thermal transfer temperatures such as around 120° for a half hour. Recommended acids include p-toluenesulfonic acid, α-naphthalenesulfonic acid, β-naphthalenesulfonic acid, and 1-octanesulfonic acid. In addition to this acid, a small amount of concentrated sulfuric acid may also be added to the diazo process mixture to further stabilize against premature coupling.

Although many of the generally used couplers are quite soluble in toluene, the addition of a long chain aliphatic group as is done with the diazonium compounds can be very helpful in creating a diazo process mixture that will thermally transfer in a more uniform manner. An example of this type of compound is 5-octyloxyresorcinol which is synthesized as follows:

To a stirred solution of phloroglucinol (126 g. 1.0 mol) and KOH (19.0 g, 0.34 mol) in DMF was added 1-bromooctane (200 g, 1.04 mol). After heating the mixture for 16 hr. at 100° C., 250 ml of glacial acetic acid was added and the mixture was filtered. The filtrate was concentrated, dissolved in $Et_2O$, washed with water, and extracted with 10% aqueous NaOH. The alkaline solution was washed with $Et_2O$, acidified with dilute HCl, and extracted with $Et_2O$. The organic phase was dried ($MgSO_4$), treated with charcoal, and filtered. The solvent was evaporated and the residue distilled to give an almost colorless resin, bp 183°–188° C. (0.15 mm).

Again, the preferred method of development is moist ammonia gas, which may be used at atmospheric or at higher pressures. The honeycomb-like grid pattern may thus be made in one or both subsurfaces of the optical body. Proprietary protective hardcoatings and/or anti-reflection (AR) coatings as are used in the eyeglass lens industry may then be applied.

Reference is made to the attached appendix which includes lens prescriptions for the various lens elements described herein.

Various embodiments and suggestions have herein been disclosed for the design of this inventive system. However, specific embodiments and suggestions such as particular lens diagrams have been given for illustrative purposes and should not be construed to impose limitations on this disclosure. Many variations and modifications of the preferred embodiments both in the materials and in the design are possible while keeping within the scope of the appended claims.

APPENDIX

Lens elements 2 through 7 as shown in FIGS. 3, 4, and 5 are all part of a Tropel Model T27-100-300 beam expander-collimator available from Newport/Klinger Corporation of Irvine, Calif. For lasers with small beam diameters, the Model T27-100-150 may be used. Lens elements 8 and 9 as shown in FIGS. 3 and 5 may be fabricated according to the following data:

| | SURFACE PARAMETERS | |
|---|---|---|
| Lens Surface | Primary | Secondary |
| Diameter (mm) | 100.0 | 100.0 |
| Vertex Radius (mm) | 105.65122 | 333.54885 |
| Material | $CaF_2$ | $CaF_2$ |
| Thickness (mm) | 15.0 | 15.0 |
| Conic Constant | −0.78848 | −0.73469 |
| $A_4(mm^{-3})$ | $-4.61753 \times 10^{-6}$ | $4.50140 \times 10^{-8}$ |
| $A_6(mm^{-5})$ | $2.00366 \times 10^{-9}$ | $-8.18844 \times 10^{-11}$ |

Radius of the Working Aperture of the Primary = 27.0 mm
Radius of the Working Aperture of the Secondary = 40.0 mm
Distance Between the Lenses = 500 mm for use at 363.789 nm
Distance Between the Lenses = 502.976 mm for use at 441.567 nm
Index $CaF_2$ = 1.445016 at 363.789 nm
Index $CaF_2$ = 1.439141 at 441.567 nm Only the exit side of primary lens element 8 and the entrance side of secondary lens element 9 are aspherized; the remaining sides are flat. The distance between the lenses may be changed for use at various wavelengths because the ray pathway distance errors which occur when the lenses are used for a wavelength other than that for which they are designed are smaller than the assembling alignment errors.

The following lens data is for the objective lens elements 11 through 14 as shown in FIG. 3:

| ELEMENT | RADIUS OF CURVATURE | | THICKNESS INFINITY | APERTURE DIAMETER | | |
|---|---|---|---|---|---|---|
| NUMBER OBJECT | FRONT | BACK | APERTURE STOP | FRONT | BACK | GLASS |
| | INF | | 0.6350 | 80.0000 | | |
| 11 | 210.2031 CX | 1068.6881 CC | 9.1216 | 80.0932 | 79.1148 | SF56A Schott |
| | | | 0.6350 | | | |
| 12 | 109.0557 CX | 214.6461 CC | 10.1988 | 77.4599 | 74.4918 | SF56A Schott |
| | | | 6.5157 | | | |
| 13 | −911.7446 CC | 1238.2489 CC | 8.0000 | 73.0676 | 70.6402 | SF56A Schott |
| | | | 84.6423 | | | |
| 14 | 51.3943 CX | 180.1305 CC | 11.7881 | 32.6629 | 27.4436 | SF56A Schott |
| IMAGE | IMAGE DISTANCE = INF | | 28.6949 | 2.0380 | | |

REFERENCE WAVELENGTH = 441.567 NM
INFINITE CONJUGATES
EFL = 98.0392
BFL = 28.7011
FFL = 24.1156
F/NO = 1.2255
IMAGE DIST = 28.6949
OAL = 131.5376
PARAXIAL IMAGE HT = 1.0190
SEMI-FIELD ANGLE = 0.5955
ENTR PUPIL
DIAMETER = 80.0000
DISTANCE = 0.0000
EXIT PUPIL
DIAMETER = 325.2309
DISTANCE = 427.2685
REFRACTIVE INDICES

-continued

| ELEMENT NUMBER | RADIUS OF CURVATURE | | THICKNESS INFINITY APERTURE STOP | APERTURE DIAMETER | | GLASS |
|---|---|---|---|---|---|---|
| | FRONT | BACK | | FRONT | BACK | |
| OBJECT | INF | | 0.6350 | 80.0000 | | |

GLASS CODE 441.567 NM
SF56A SCHOTT 1.821978
NOTES
Positive radius indicates the center of curvature is to the right
Negative radius indicates the center of curvature is to the left
Dimensions are given in millimeters
Thickness is axial distance to next surface
Image diameter shown above is a paraxial value, it is not a ray traced value
BFL = back focal length and is measured from the last surface
FFL = field focal length and is measured from the first surface
F/NO = f number
OAL = overall length As a simple and efficient alternative to the pinholes on the focal plane shown in FIG. 6 at 15, the second and higher spectral orders from the holographic diffraction grating may be stopped out with a single field stop rather than with multiple pinholes. The field stop should have a diameter large enough to peripherally surround the first spectral order focal points.

The following lens data is for the tail-end lens elements 16 through 21 as shown in FIG. 6:

| ELEMENT NUMBER | RADIUS OF CURVATURE | | THICKNESS | APERTURE DIAMETER | | GLASS |
|---|---|---|---|---|---|---|
| | FRONT | BACK | | FRONT | BACK | |
| OBJECT | INF | | INFINITY APERTURE STOP | 3.3800 | | |
| | | | 0.0000 | 3.3800 | | |
| | | | 0.0000 | 3.3800 | | |
| | | | 0.0000 | 3.3800 | | |
| | | | 1.0000 | | | |
| 16 | 19.9858 CX | −10.9808 CX | 2.1000 | 4.3775 | 5.0221 | SF8 Schott |
| | | | 0.8313 | | | |
| 17 | −7.2475 CC | −4.5262 CX | 2.2000 | 6.0000 | 6.0048 | SF8 Schott |
| | | | 0.5080 | | | |
| 18 | −8.1303 CC | −25.7159 CX | 1.8000 | 7.0000 | 5.7743 | SF8 Schott |
| | | | 2.3619 | | | |
| 19 | −3.3800 CC | −69.3526 CX | 1.8000 | 6.0000 | 9.4000 | SF8 Schott |
| | | | 4.3461 | | | |
| 20 | −5.4986 CC | A(1) | 1.8000 | 10.6000 | 17.6400 | CAFL |
| | | | 5.6694 | | | |
| 21 | −9.6672 CC | −14.5000 CX | 2.5000 | 19.2599 | 27.7200 | BSL3 Ohara |
| | IMAGE DISTANCE = | | 12.5000 | | | |
| IMAGE | −27.0688 CC | | | 36.2661 | | |

ASPHERIC CONSTANTS $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

| ASPHERIC | CURV | K | A | B | C | D |
|---|---|---|---|---|---|---|
| A(1) | −0.07317931 | 0.901756 | 1.00587E-05 | 1.26275E-07 | −9.18333E-10 | 2.41528E-11 |

REFERENCE WAVELENGTH = 441.567 NM
INFINITE CONJUGATES                                                         REFRACTIVE INDICES

| EFL | = | −40.7275 | SEMI-FIELD | | | GLASS CODE | 441.567 NM |
|---|---|---|---|---|---|---|---|
| BFL | = | −27.4299 | ANGLE | = | 24.0000 | SF8 SCHOTT | 1.715940 |
| FFL | = | 129.0550 | ENTR PUPIL | | | CaFL | 1.439141 |
| F/NO | = | −12.0496 | DIAMETER | = | 3.3800 | BSL3 ONARA | 1.507149 |
| IMAGE DIST | = | 12.5000 | DISTANCE | = | 0.0000 | | |
| OAL | = | 26.9167 | EXIT PUPIL | | | | |

| PARAXIAL | | | DIAMETER | = | 1.0667 |
| --- | --- | --- | --- | --- | --- |
| IMAGE HT | = | 18.1330 | DISTANCE | = | −14.5771 |

The following additional lens data is for an optical system (not shown) operating at 363.789 nm.

OBJECTIVE SECTION

| | RADIUS | THICKNESS | GLASS |
| --- | --- | --- | --- |
| >OBJ: | INFINITY | INFINITY | |
| STOP: | INFINITY | 10.000000 | |
| 2: | 228.11740 | 11.517281 | UBK7 SCHOTT |
| 3: | INFINITY | 0.635000 | |
| 4: | 120.65000 | 11.345023 | UBK7 SCHOTT |
| 5: | 267.08100 | 0.635000 | |
| 6: | 78.30820 | 8.000000 | UBK7 SCHOTT |
| 7: | 55.49900 | 26.944376 | |
| 8: | 62.71260 | 12.315787 | UBK7 SCHOTT |
| 9: | 119.78640 | 72.504404 | |
| 10: | 29.64180 | 8.779575 | UBK7 SCHOTT |
| 11: | INFINITY | 17.500000 | |
| IMG: | INFINITY | 0.000000 | |

SPECIFICATION DATA

| NA | 0.44000 |
| --- | --- |
| DIM | MM |
| WL | 363.789 NM |

APERTURE DATA

| CA | |
| --- | --- |
| CIR S2 | 45.000000 |
| CIR S3 | 45.000000 |
| CIR S4 | 45.000000 |
| CIR S5 | 45.000000 |
| CIR S6 | 40.000000 |
| CIR S7 | 40.000000 |
| CIR S8 | 34.000000 |
| CIR S9 | 32.000000 |
| CIR S10 | 14.500000 |
| CIR S11 | 14.500000 |

REFRACTIVE INDICES

| GLASS CODE | 363.789 NM |
| --- | --- |
| UBK7 SCHOTT | 1.536451 |

INFINITE CONJUGATES

| EFL | 90.9082 |
| --- | --- |
| BFL | 17.5144 |
| FFL | 126.1213 |
| FNO | 1.1364 |
| IMG DIS | 17.5000 |
| OAL | 162.6764 |

PARAXIAL IMAGE

| HT | 1.4488 |
| --- | --- |
| ANG | 0.9130 |

ENTRANCE PUPIL

| DIA | 79.9992 |
| --- | --- |
| THI | 0.0000 |

EXIT PUPIL

| DIA | 57.6635 |
| --- | --- |
| THI | 83.0411 |

TAIL-END SECTION

| | RADIUS | THICKNESS | GLASS |
| --- | --- | --- | --- |
| >OBJ: | INFINITY | INFINITY | |
| STOP: | INFINITY | 0.000000 | |
| 2: | INFINITY | 0.000000 | |
| 3: | INFINITY | 0.000000 | |
| 4: | INFINITY | 1.000000 | |
| 5: | 6.67004 | 2.538741 | UBK7 SCHOTT |
| 6: | −7.89432 | 0.65322 | |
| 7: | −4.78790 | 1.823289 | UBK7 SCHOTT |
| 8: | −4.27228 | 0.441378 | |
| 9: | −6.36524 | 1.800000 | UBK7 SCHOTT |
| 10: | 12.64920 | 3.370817 | |
| 11: | −3.09372 | 1.816353 | UBK7 SCHOTT |
| 12: | −9.88060 | 3.712793 | |
| 13: | −6.28142 | 2.000000 | UBK7 SCHOTT |
| 14: | −11.68400 | 3.605108 | |
| 15: | −10.50544 | 2.500000 | K10 SCHOTT |
| 16: | −14.77010 | 12.500000 | |
| IMG: | −27.000000 | 0.000000 | |

SPECIFICATION DATA

| EPD | 1.81371 |
| --- | --- |
| DIM | MM |
| WL | 363.789 NM |

APERTURE DATA

| CA | |
| --- | --- |
| CIR S5 | 2.100000 |
| CIR S6 | 2.353458 |
| CIR S7 | 2.379504 |
| CIR S8 | 2.718890 |
| CIR S9 | 2.629131 |
| CIR S10 | 2.939789 |
| CIR S11 | 3.070000 |
| CIR S12 | 5.800000 |
| CIR S13 | 6.204943 |
| CIR S14 | 9.865171 |
| CIR S15 | 10.366301 |
| CIR S16 | 13.992887 |

REFRACTIVE INDICES

| GLASS CODE | 363.789 NM |
| --- | --- |
| K10 SCHOTT | 1.523762 |
| UBK7 SCHOTT | 1.536451 |

INFINITE CONJUGATES

| | POS 1 | POS 2 | POS 3 |
| --- | --- | --- | --- |
| EFL | 104.2146 | 104.2146 | 104.2146 |
| BFL | 20.7579 | 20.7579 | 20.7579 |
| FFL | −307.9729 | −307.9729 | −307.9729 |
| FNO | 57.4594 | 49.7718 | 35.9656 |
| IMG DIS | 12.5000 | 12.5000 | 12.5000 |
| OAL | 25.2338 | 25.2338 | 25.2338 |

PARAXIAL IMAGE

| HT | 47.4150 | 47.3836 | 47.8211 |
| --- | --- | --- | --- |
| ANG | 24.4643 | 24.4500 | 24.6490 |

ENTRANCE PUPIL

| DIA | 1.8137 | 2.0939 | 2.8976 |
| --- | --- | --- | --- |
| THI | 0.0000 | 0.0000 | 0.0000 |

EXIT PUPIL

| DIA | 0.6137 | 0.7085 | 0.9805 |
| --- | --- | --- | --- |
| THI | −14.5072 | −14.5072 | −14.5072 |
| STOP DIA | 1.8137 | 2.0938 | 2.8976 |

What is claimed is:

1. A holographic projector system for exposing a photo-sensitive substrate, comprising:

a laser light source providing a relatively narrow beam of substantially collimated light;

means for expanding and distributing the intensity profile of said narrow beam to provide an expanded beam of substantially collimated light having a selected energy level distribution;

means for separating said expanded beam into a plurality of at least three substantially collimated beams which diverge with respect to each other, said beam separating means comprising a holographic diffraction grating; and means for converging said plurality of beams toward each other thereby effecting their subsequent divergence from each other in order to result in crossing of their paths to produce a three-dimensional standing wave interference pattern for incidence upon the substrate, whereby said interference pattern produces a lattice of diverging intensity maxima in the photosensitive substrate, and whereby said converging means comprises a consecutive series of lens elements aligned along a common axis.

2. The holographic projector system of claim 1 further including correctional lens means disposed between said beam separating means and the substrate for providing a corrected three-dimensional standing wave interference pattern with substantially constant interferometric angles.

3. The holographic projector system of claim 1 wherein the photosensitive substrate comprises an eyeglass lens.

4. The holographic projector system of claim 1 wherein the photosensitive substrate includes a photosensitive material selected from the group consisting of photoresist, index of refraction modulation media, light occluding media, and light absorption media.

5. The holographic projector system of claim 4 wherein said index of refraction modulation media is selected from the group consisting of a dichromated gelatin and a photopolymer material.

6. The holographic projector system of claim 4 wherein said light absorption and occluding media is derived from a material selected from the group consisting of silver halide, leuco dye, and diazo material.

7. The holographic projector system of claim 1 wherein the photosensitive substrate includes a photosensitive material comprising vesicular diazo material.

8. The holographic projector system of claim 1 wherein the photosensitive substrate includes a photosensitive material comprising reverse vesicular diazo material.

9. The holographic projector system of claim 1 wherein the photosensitive substrate includes a photosensitive material comprising reverse vesicular diazo material in combination with azo dye imaging material.

10. The holographic projector system of claim 1 wherein said substrate has a photosensitive coating thereon.

11. The holographic projector system of claim 1 wherein said substrate has a photosensitive material distributed therein.

12. The holographic projector system of claim 11 wherein said photosensitive material comprises a diazo compound.

13. The holographic projector system of claim 11 wherein said photosensitive material comprises a diazo compound with a long chain aliphatic group.

14. The holographic projector system of claim 11 wherein said photosensitive material comprises a diazo compound soluble in a relatively nonpolar solvent.

15. The holographic projector system of claim 1 wherein said holographic diffraction grating divides the incident expanded beam principally into three mutually diverging spectral order beams of substantially the same intensity profile.

16. The holographic projector system of claim 1 wherein said holographic diffraction grating divides the incident expanded beam principally into four mutually diverging spectral order beams of substantially the same intensity profile.

17. The holographic projector system of claim 1 further including pinhole means for blocking undesired spectral order beams projected by said holographic diffraction means and scattered light.

18. The holographic projector system of claim 2 wherein the diverging lattice of intensity maxima is formed so that said maxima are generally of uniform dimension and diverge from a central point.

19. The holographic projector system of claim 2 wherein the diverging lattice of intensity maxima is formed so that said maxima are generally of uniform dimension and diverge from selected distribution points.

20. The holographic projector system of claim 1 wherein said means for expanding and distributing said narrow beam comprises beam expander means for reshaping said narrow beam to said expanded beam, and beam profile distributor means for distributing the intensity of the beam wavefront in a selected manner across the profile of said expanded beam.

21. The holographic projector system of claim 1 wherein said selected energy profile provides substantially the same intensity in each region of intensity maxima at various locations of incidence across the surface of the substrate.

22. The holographic projector system of claim 4 wherein the photosensitive substrate is exposed while immersed in a refractive index matching liquid.

23. The holographic projector system of claim 4 wherein the photosensitive substrate is exposed while in air.

24. The holographic projector system of claim 4 wherein the photosensitive substrate comprises a photoresist material developed after exposure and etched to produce a relief pattern.

25. The holographic projector system of claim 1 wherein said holographic diffraction grating is defined as:

a diffraction grating for use in a design wavelength, wherein the grating comprises a repetitive pattern of rhombic unit cells;

wherein each rhombic unit cell comprises four rhombic portions, a first pair of the rhombic portions being adjacent each other along a first side of the unit cell, and the remaining pair of the rhombic cell portions being adjacent each other along a second side of the unit cell, the remaining pair of the rhombic portions being contiguous with the first pair along one side thereof;

wherein each of the four rhombic portions is bisected into equilateral triangular regions of equal area, each of the triangular regions having an optical thickness corresponding to a phase level with respect to the design wavelength;

wherein the phase levels of the triangular regions in the first pair of rhombic portions are $\pi$, $2\pi/3$, 0, and $2\pi/3$ radians, in order along a first direction; and wherein the phase levels of the triangular regions in the second pair of rhombic portions are 0, $2\pi/3$, 0, and $5\pi/3$ radians, in order along a second similar parallel direction.

26. The holographic projector system of claim 1 wherein said holographic diffraction grating is defined as:

a diffraction grating for use at a design wavelength, wherein the grating comprises a repetitive pattern of rhombic unit cells;

wherein each rhombic cell unit comprises sixteen rhombic portions, a first four of the rhombic portions being in a row adjacent each other along a first side of the unit cell, the remaining rhombic portions forming rows of four, each adjacent and contiguous along a side of each previously formed row thereof;

wherein each of the sixteen rhombic portions is bisected into equilateral triangular regions of equal area, each of the triangular regions having an optical thickness corresponding to a phase level with respect to the design wavelength;

wherein the phase levels of the triangular regions in the first row of rhombic portions are 0.0, 0.0, 0.0, 0.0, 0.295167, 0.647584, 0.295167, and 0.0 radians, in order along a first direction;

wherein the phase levels of the triangular regions in the second row of rhombic portions are 0.0, 0.0, 0.647584, 0.647584, 0.647584, 0.647584, 0.647584, and 0.0 radians, along a second similar parallel direction;

wherein the phase levels of the triangular regions in the third row of rhombic portions are 0.295167, 0.647584, 0.647584, 0.647584, 0.647584, 0.647584, 0.295167, and 0.295167 radians, along a third similar parallel direction; and wherein the phase levels of the triangular regions in the fourth row of rhombic portions are 0.295167, 0.0, 0.647584, 0.0, 0.295167, 0.295167, 0.295167 and 0.295167 radians, along a fourth similar parallel direction.

27. The holographic projector system of claim 1 wherein said holographic diffraction grating is defined as:

a diffraction grating for use at a design wavelength, wherein the grating comprises a repetitive pattern of square unit cells;

wherein each square unit cell comprises four square regions of equal area, each of the square regions having an optical thickness corresponding to a phase level with respect to the design wavelength; and wherein the phase levels of the square regions are $\pi$, 0, $\pi$, and 0 radians, in order along a rotational direction.

28. The holographic projector system of claim 1 wherein said holographic diffraction grating is defined as:

a diffraction grating for use at a design wavelength, wherein the grating comprises a repetitive pattern of square unit cells;

wherein each square unit cell comprises four square regions of equal area, each of the square regions having an optical thickness corresponding to a phase level with respect to the design wavelength; and wherein the phase levels of the square regions are $3\pi/2$, 0, $\pi/2$, and $\pi$ radians, in order along a rotational direction.

29. A method of producing a lattice of diverging intensity maxima in a photosensitive substrate, said method comprising the steps of:

providing a substantially collimated beam of light having a selected energy profile;

separating the beam with a single optical element comprising a holographic diffraction grating into a plurality of at least three substantially collimated beams which diverge with respect to each other;

converging said plurality of beams toward each other through a consecutive series of lens elements aligned on a common axis, thereby to result in crossing of their paths and subsequent diverging of said beams from each other to produce a three-dimensional standing wave interference pattern to produce the lattice of diverging intensity maxima therein.

30. The method of claim 29 further including the step of correcting the interference pattern to provide substantially uniform interferometric angles.

31. The method of claim 29 wherein said step of providing the collimated beam comprises expanding a narrow light beam from a laser to form a collimated beam of expanded cross section, and distributing the beam wavefront to provide a selected intensity profile.

32. The method of claim 29 wherein said substrate comprises a lens.

* * * * *